United States Patent
Bar et al.

(10) Patent No.: US 12,038,312 B2
(45) Date of Patent: Jul. 16, 2024

(54) METHODS AND DEVICES FOR DETERMINATION OF DIFFERENTIAL PARAMETERS ASSOCIATED WITH FLUID FLOW WITHIN A CONDUIT

(71) Applicant: FEELIT TECHNOLOGIES LTD., Haifa (IL)

(72) Inventors: Meital Bar, Yokneam Illit (IL); Gady Konvalina, Haifa (IL); Oded Shlomo Kraft-Oz, Haifa (IL); Amit Levy-Yamamori, Haifa (IL)

(73) Assignee: FEELIT TECHNOLOGIES LTD., Haifa (IL)

( * ) Notice: Subject to any disclaimer, the term of this patent is extended or adjusted under 35 U.S.C. 154(b) by 0 days.

(21) Appl. No.: 17/600,159

(22) PCT Filed: Apr. 1, 2020

(86) PCT No.: PCT/IL2020/050392
§ 371 (c)(1),
(2) Date: Sep. 30, 2021

(87) PCT Pub. No.: WO2020/202151
PCT Pub. Date: Oct. 8, 2020

(65) Prior Publication Data
US 2022/0155112 A1    May 19, 2022

Related U.S. Application Data

(60) Provisional application No. 62/827,226, filed on Apr. 1, 2019.

(51) Int. Cl.
*G01F 1/36* (2006.01)
*G01F 1/44* (2006.01)

(52) U.S. Cl.
CPC ............... *G01F 1/363* (2013.01); *G01F 1/44* (2013.01)

(58) Field of Classification Search
CPC ... G01F 1/34; G01F 1/36; G01F 1/363; G01F 1/44
See application file for complete search history.

(56) References Cited

U.S. PATENT DOCUMENTS

| | | | | |
|---|---|---|---|---|
| 6,698,297 B2 * | 3/2004 | Gysling | ............... | G01F 1/44 73/861.63 |
| 7,058,549 B2 * | 6/2006 | Gysling | ............... | G01F 1/7082 702/45 |

(Continued)

FOREIGN PATENT DOCUMENTS

| CN | 106648226 A | 5/2017 |
|---|---|---|
| EP | 1944583 A1 | 7/2008 |

(Continued)

OTHER PUBLICATIONS

Sadeghioon et al., (2014) SmartPipes: Smart Wireless Sensor Networks for Leak Detection in Water Pipelines. J Sens Actuator Netw 3(1): 64-78 (15 pages).

(Continued)

*Primary Examiner* — Justin N Olamit
(74) *Attorney, Agent, or Firm* — Roach Brown McCarthy & Gruber, P.C.; Kevin D. McCarthy

(57) ABSTRACT

The present invention provides methods for determining a parameter associated with a flow of a fluid located within a fluid conduit, based on measuring the difference between electrical signals of at least two second sensing elements contacting different positions on am exterior of the fluid conduit. The sensing elements comprise an assembly of nanoparticles being in electric contact with conductive electrodes; wherein the electrical signals of the sensing elements are responsive to at least one of pressure and temperature.

(Continued)

Further provided is a clamping device configured to reduce a cross-sectional diameter of a portion of the fluid conduit, in order to determine said parameter.

10 Claims, 18 Drawing Sheets

(56) References Cited

U.S. PATENT DOCUMENTS

| | | | |
|---|---|---|---|
| 7,451,663 B2* | 11/2008 | Kimball | G01F 15/006 |
| | | | 73/861.63 |
| 8,931,520 B2 | 1/2015 | Fernald | |
| 9,164,009 B2* | 10/2015 | Mouchel La Fosse | |
| | | | G01L 9/0027 |
| 9,562,814 B2 | 2/2017 | Kulkarni et al. | |
| 9,632,050 B2 | 4/2017 | Zhong et al. | |
| 9,784,631 B2 | 10/2017 | Haick et al. | |
| 11,105,664 B2* | 8/2021 | Miller | G01F 1/34 |
| 2003/0214199 A1 | 11/2003 | Heim et al. | |
| 2005/0166414 A1 | 8/2005 | Lum et al. | |
| 2006/0253942 A1 | 11/2006 | Barrera et al. | |
| 2013/0018611 A1 | 1/2013 | Sturmer | |
| 2013/0228018 A1 | 9/2013 | Mouchel La Fosse et al. | |
| 2014/0360279 A1 | 12/2014 | Jenkins | |
| 2016/0138997 A1 | 5/2016 | Zhu et al. | |
| 2017/0281006 A1 | 10/2017 | Aho et al. | |
| 2017/0363489 A1* | 12/2017 | Haick | G01L 5/22 |
| 2018/0067003 A1 | 3/2018 | Michiwaki | |
| 2018/0073943 A1 | 3/2018 | Zeng et al. | |
| 2018/0209829 A1 | 7/2018 | Makino et al. | |
| 2018/0274956 A1 | 9/2018 | Miller et al. | |
| 2019/0195398 A1 | 6/2019 | Nüssen et al. | |
| 2019/0244467 A1* | 8/2019 | Geva | G07F 11/44 |
| 2019/0265015 A1 | 8/2019 | Michiwaki | |
| 2019/0290139 A1* | 9/2019 | Sio | A61B 5/02125 |
| 2019/0353541 A1 | 11/2019 | Shapiro | |
| 2019/0390564 A1* | 12/2019 | Parsons | F01D 21/003 |
| 2020/0011169 A1 | 1/2020 | Haghshenas et al. | |
| 2020/0025699 A1 | 1/2020 | Yeo et al. | |
| 2020/0264084 A1 | 8/2020 | Wiens et al. | |
| 2020/0300599 A1 | 9/2020 | Andrews et al. | |
| 2020/0367769 A1* | 11/2020 | Domnich | H04L 67/12 |

FOREIGN PATENT DOCUMENTS

| | | |
|---|---|---|
| EP | 3270122 A1 | 1/2018 |
| JP | 2001114085 A * | 4/2001 |
| WO | 2004053464 A1 | 6/2004 |
| WO | 2017114978 A1 | 7/2017 |
| WO | 2019116212 A2 | 6/2019 |
| WO | 2019207468 A1 | 10/2019 |

OTHER PUBLICATIONS

Zhang (2017) Analysis on the effect of venturi tube structural parameters on fluid flow. AIP Advances 7: 065315; (10 pages).

* cited by examiner

METHODS AND DEVICES FOR DETERMINATION OF DIFFERENTIAL PARAMETERS ASSOCIATED WITH FLUID FLOW WITHIN A CONDUIT

FIELD OF THE INVENTION

Provided herein are methods and systems for determining a parameter associated with a flow of a fluid located within a fluid conduit, comprising the use of at least two sensing elements, wherein each sensing element comprises an assembly of nanoparticles being in electric contact with at least two conductive electrodes.

BACKGROUND OF THE INVENTION

Fluid containing vessels are widely used in many fields, such as chemical plants, semi-conductor manufacturing, power stations, irrigation and watering systems, oil and gas systems, medical devices, and various manufacturing processes. Such vessels can include pressure or vacuum vessels, which are suitable to operate within a wide range of pressures, and therefore their proper operation is critical for safety reasons, particularly since they may contain and control flammable, explosive, virulent, or corrosive materials.

Flow control devices such as valves are important for the proper operation of pressure or vacuum vessels, and can be activated by at least one of an air pressure, an actuator, or a solenoid. Usually, valves are controlled by various control systems, such as, for example, a Programmable Logic Controller (PLC). Such control systems can be used to regulate the open/close positions of the valves or vessels, in order to control the manufacturing process, including the injection of gasses or liquids during the manufacturing process.

Accurate alignment of the control points, valves, and vessels, with the planned activation and actuators within the manufacturing process is highly important. Time misalignment between the planned activation of valves could lead to manufacturing defects, safety events, and system components deterioration such as wear, tear or deformation of sealing components or other components of the flow control device. Misalignment can create a timing drift in the process and change the amount of a liquid or gaseous material dispensed. In addition, the proper operation of pressure or vacuum vessels is important for environmental protection from pollution resulting from leakage, as well as maintaining cost effective manufacturing processes.

In many industries, such as, for example, semi-conductor and biotechnology industries, the time of dispensing and the amount of dispensed fluid may be of critical importance, and may impact various aspects of the manufacturing process, such as the characteristics of the batch, the safety of the batch, the safety of the personnel managing the manufacturing line, and the performance of the facility. Therefore, it is important to enable measurement and monitoring of time-related parameters, based on variations in pressure and/or temperature resulting from the flow fluctuations within the flow system, including valves and vessels, in an accurate and convenient manner.

Typically, pressure can be measured by intrusive pressure measurement devices, such as pressure gauges located within the vessel, in which case the gauges are in direct contact with the materials contained therewithin. However, it is not always applicable or cost-effective to mount such pressure gauges. For example, sometimes it will require upgrading the installed equipment, or the installation of gauges will change the integrity of the vessel, which may lead to certain safety issues. Furthermore, in some cases, the material of the pressure gauge may be incompatible with the material contained within the vessel, for example, when sterile conditions are required or special regulations apply.

Currently known non-invasive pressure measurement methods include the strain gauge method, the capacitor method and the ultrasonic method. Although these methods allow pressure measurement, their accuracy and sensitivity, simplicity of calculation, sensors pricing and, as a consequence, the dispersion of sensors, sensors size and thickness, should still be improved. For example, the accuracy of the strain gauge method is heavily affected by the environment, particularly the temperature and humidity. The capacitor method is only applicable for small-diameter pressure vessels, and its accuracy is sensitive to the type of medium inside the pressure vessel and the environment. The ultrasonic method involves an acoustic sensor which can correlate the acoustic shift to the pressure, however this method is limited in effectiveness in an environment where additional vibrations may be present due to low signal-to-noise (S/N) ratios and therefore may be limited in accuracy.

The use of devices for measuring the pressure of a fluid carried in a vessel utilizing electrodes and a nano assembly of conductive or semi-conductive nanoparticles has been previously suggested. For example, U.S. Pat. No. 9,164,009 discloses a device for measuring the pressure of a fluid carried in a conduit, wherein the device comprises a first electrode, a second electrode, a nano assembly of conductive or semi-conductive nanoparticles in contact with the two electrodes, and a measurement device. The measurement device provides proportional information with respect to an electrical property of the nanoassembly, and the electrical property is measured between the first and second electrode, and the electrical property is sensitive to the distance between the nanoparticles of the nanoassembly.

There remains an unmet need for accurate, direct, and non-intrusive methods and devices for determining differential parameters associated with the flow of a fluid located within a pipe or vessel, which would allow detecting minute time misalignments and flow gradients.

SUMMARY OF THE INVENTION

The present invention provides methods and devices for determining a differential parameter associated with a flow of a fluid located within a fluid conduit. The methods are implemented by detecting changes in pressure or temperature of a fluid conduit between two different points thereon, said changes indicating a change in the flow rate or pattern of the fluid within said conduit. For example, a static valve or a seal within a vessel can cause fluid flow changes or pressure build up. Additionally, the present method allows determining activation transfer time of a valve (also termed herein "time to open"), meaning the time difference between the moment the control actuation has started until the actual time the fluid flow started to change. The time to open parameter can be determined by measuring and analyzing the difference in pressure and/or temperature changes between the valve inlet and outlet during and following the valve opening, or between the valve inlet and a position along the fluid conduit in proximity to the valve.

The methods of the present invention, which allow detecting minute changes in the flow of a fluid, which are manifested by changes in pressure or temperature, are afforded by provision of at least two sensing elements, which have extremely high sensitivity and high accuracy towards pressure and temperature sensing, as well as very short response time. While presently known sensors used to measure fluid parameters suffer from low S/N ratios and essentially long response times, the sensing elements according to the principles of the present invention have the high resolution required to provide an accurate calculation of various parameters associated with a flow of a fluid located within a fluid conduit, by analyzing the difference between the electrical signals of said sensing elements, which are in contact with at least two different points on said fluid conduit. The electrical signals can conveniently be measured and analyzed by an electric circuit to which the sensing elements are connected.

Further provided is a clamping device configured to assist in the detection of fluid flow changes reflected by the changes in pressure and/or temperature within the fluid conduit.

According to one aspect, there is provided a method for determining a parameter associated with a flow of a fluid located within a fluid conduit, the method comprising: providing at least a first and a second sensing elements comprising an assembly of nanoparticles being in electric contact with conductive electrodes; wherein the first sensing element contacts a first position on an exterior of the fluid conduit and the second sensing element contacts a second position on the exterior of the fluid conduit; measuring an electrical signal of the first and the second sensing elements; wherein the electrical signal is responsive to at least one of pressure and temperature; and determining, based on the difference between the electrical signals of the first and the second sensing elements, said parameter.

According to some embodiments, the measurement of the electrical signals of the first and the second sensing elements is performed simultaneously.

According to some embodiments, the method further comprises learning, during a learning period, a relationship between values of the difference between the electrical signals of the first and the second sensing elements and values of said parameter, wherein the determining of said parameter is based on the relationship. According to some embodiments, the method further comprises receiving information about a relationship between values of the difference between the electrical signals of the first and the second sensing elements and values of said parameter, wherein the determining of said parameter is based on the relationship.

According to some embodiments, the first and the second sensing elements are connected to a mutual time monitoring system.

According to some embodiments, said difference between the electrical signals of the first and the second sensing elements is a time related difference between the occurrence of a change in the measured electrical signals of the first and the second sensing elements.

According to some embodiments, said parameter is indicative of an activation transfer time of a valve. According to some related embodiments, the fluid conduit comprises a valve and a pipe fluidly connected with the valve, wherein the fluid flows from the valve to the pipe. According to further embodiments, the first position is located on the valve and the second position is located on the pipe in close proximity to the valve. According to additional related embodiments, the fluid conduit comprises a first pipe, a second pipe, and a valve, wherein the first and the second pipes are fluidly connected through a valve. According to further embodiments, the first position is located on the first pipe in close proximity to the valve and the second position is located on the second pipe in close proximity to the valve.

According to some embodiments, said parameter is indicative of a pressure wave velocity. According to some related embodiments, the fluid conduit comprises a valve and a pipe fluidly connected with the valve, wherein the fluid flows from the valve to the pipe. According to further embodiments, the first position is located on the pipe in a close proximity to the valve and the second position is located on the pipe at a distance of at least about 10 cm from the first position. According to additional related embodiments, the fluid conduit comprises a first pipe and a second pipe fluidly connected through a valve. According to further embodiments, the first position is located on the first pipe in close proximity to the valve and the second position is located on the second pipe at a distance of at least about 5 cm from the valve. According to further related embodiments, the method further comprises: providing a third sensing element comprising an assembly of nanoparticles being in electric contact with conductive electrodes; wherein the third sensing element contacts a third position on an exterior of the fluid conduit; measuring an electrical signal of the third sensing element, wherein the electrical signal is responsive to at least one of pressure and temperature; and determining, based on the difference between the electrical signals of the first, the second, and the third sensing elements, said parameter. According to further embodiments, the fluid conduit comprises a valve, a first pipe, and a second pipe, wherein the first and the second pipes are fluidly connected through the valve. According to still further embodiments, the first position is located on the first pipe in close proximity to the valve, the second position is located on the second pipe in close proximity to the valve, and the third position is located on the second pipe at a distance of at least about 10 cm from the second position.

According to some embodiments, said parameter is indicative of a flow rate of the fluid. According to some related embodiments, the fluid conduit comprises a first fluid conduit having a first cross-sectional diameter and a second fluid conduit having a second cross-sectional diameter, wherein the second cross-sectional diameter is smaller than the first cross-sectional diameter. According to further embodiments, the first position is located on the first fluid conduit and the second position is located on the second fluid conduit. According to certain embodiments, the first fluid conduit comprises a pipe and the second fluid conduit comprises at least one of a valve, flange, and sealing. According to further embodiments, said valve is a static valve. According to certain embodiments, the first fluid conduit and the second fluid conduit comprise a pipe, wherein the cross-sectional diameter of the second fluid conduit is diminished by mounting a clamping device on the second fluid conduit. According to further embodiments, the first and/or the second sensing elements are attached to the exterior of the fluid conduit or to an inner surface of the clamping device. According to additional related embodiments, the fluid conduit further comprises a third fluid conduit having a third cross-sectional diameter, wherein the second cross-sectional diameter is smaller than the third cross-sectional diameter, and wherein the first fluid conduit and the third fluid conduit are fluidly connected through the second fluid conduit. According to further embodiments, the first position is located on the first fluid conduit and the second position is located on the third fluid conduit. According to certain embodiments, the first and the third fluid conduits comprise a pipe and the second fluid conduit comprises at least one of a valve, flange, and sealing. According to further embodiments, said valve is a static valve. According to certain embodiments, the first fluid conduit, the second fluid conduit and the third fluid conduit comprise a pipe, wherein the cross-sectional diameter of the second fluid conduit is diminished by mounting a clamping device on the second fluid conduit. According to further embodiments, the first and the second sensing elements are attached to the exterior of the fluid conduit.

According to some embodiments, the electrical signal is produced by swelling or aggregation of the assembly of nanoparticles in response to changes in at least one of pressure and temperature. According to some embodiments, the pressure comprises lateral pressure. According to some embodiments, the electrical signal is proportional to the amount of deflection of the fluid conduit wall. According to further embodiments, said electrical signal is selected from the group consisting of resistance, conductance, alternating current (AC), electrical potential and combinations thereof.

According to some embodiments, the nanoparticles are piezoresistive nanoparticles. According to some embodiments, the nanoparticles comprise gold (Au) nanoparticles. According to further embodiments, the nanoparticles are capped with an organic coating, wherein said organic coating is selected from the group consisting of: alkylthiols, arylthiols, alkylarylthiols, alkenyl thiols, alkynyl thiols, cycloalkyl thiols, heterocyclyl thiols, heteroaryl thiols, alkylthiolates, alkenyl thiolates, alkynyl thiolates, cycloalkyl thiolates, heterocyclyl thiolates, heteroaryl thiolates, w-functionalized alkanethiolates, arenethiolates, (ω-mercaptopropyl)tri-methyloxysilane, dialkyl disulfides and combinations thereof. According to some embodiments, the assembly of nanoparticles comprises a monolayer of nanoparticles or multiple layers of nanoparticles.

According to some embodiments, the first and the second sensing elements are printed on the fluid conduit, provided on a substrate or are attached to a clamping device. According to further embodiments, the substrate is a substantially flexible substrate being made of an electrically insulating polymeric material selected from the group consisting of polyimide, polyamide, polyimine, polyethylene, polyester, polydimethylsiloxane, polyvinyl chloride, and polystyrene.

According to some embodiments, the first and the second sensing elements comprise a polymer protective coating.

According to another aspect, there is provided a clamping device, comprising: a first clamping portion comprising a first channel; a second clamping portion comprising a second channel; wherein the first clamping portion and the second clamping portion are detachably attachable to each other, and wherein the first channel and the second channel together define an enclosed channel in a closed state of the clamping device, the enclosed channel comprising: an inlet channel section having a diameter Di; an outlet channel section; a central channel section disposed between the inlet channel section and the outlet channel section, having a vertical height Hm and a lateral width Wm; wherein the vertical height Hm is smaller than the diameter Di; and wherein the lateral width is larger than the diameter Di.

According to some embodiments, at least one of the inlet channel section, the outlet channel section, and/or the central channel section, comprises at least one recess extending radially outward therefrom. According to further embodiments, the clamping device further comprises at least one sensing element attached to the enclosed channel, wherein the at least one sensing element is aligned with and stretched over the at least one recess. According to still further embodiments, the at least one sensing element comprises an assembly of nanoparticles being in electric contact with conductive electrodes.

Certain embodiments of the present invention may include some, all, or none of the above advantages. Further advantages may be readily apparent to those skilled in the art from the figures, descriptions, and claims included herein. Aspects and embodiments of the invention are further described in the specification herein below and in the appended claims.

The following embodiments and aspects thereof are described and illustrated in conjunction with systems, tools and methods which are meant to be exemplary and illustrative, but not limiting in scope. In various embodiments, one or more of the above-described problems have been reduced or eliminated, while other embodiments are directed to other advantages or improvements.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale.

In the Figures.

DETAILED DESCRIPTION

Figure 1A:
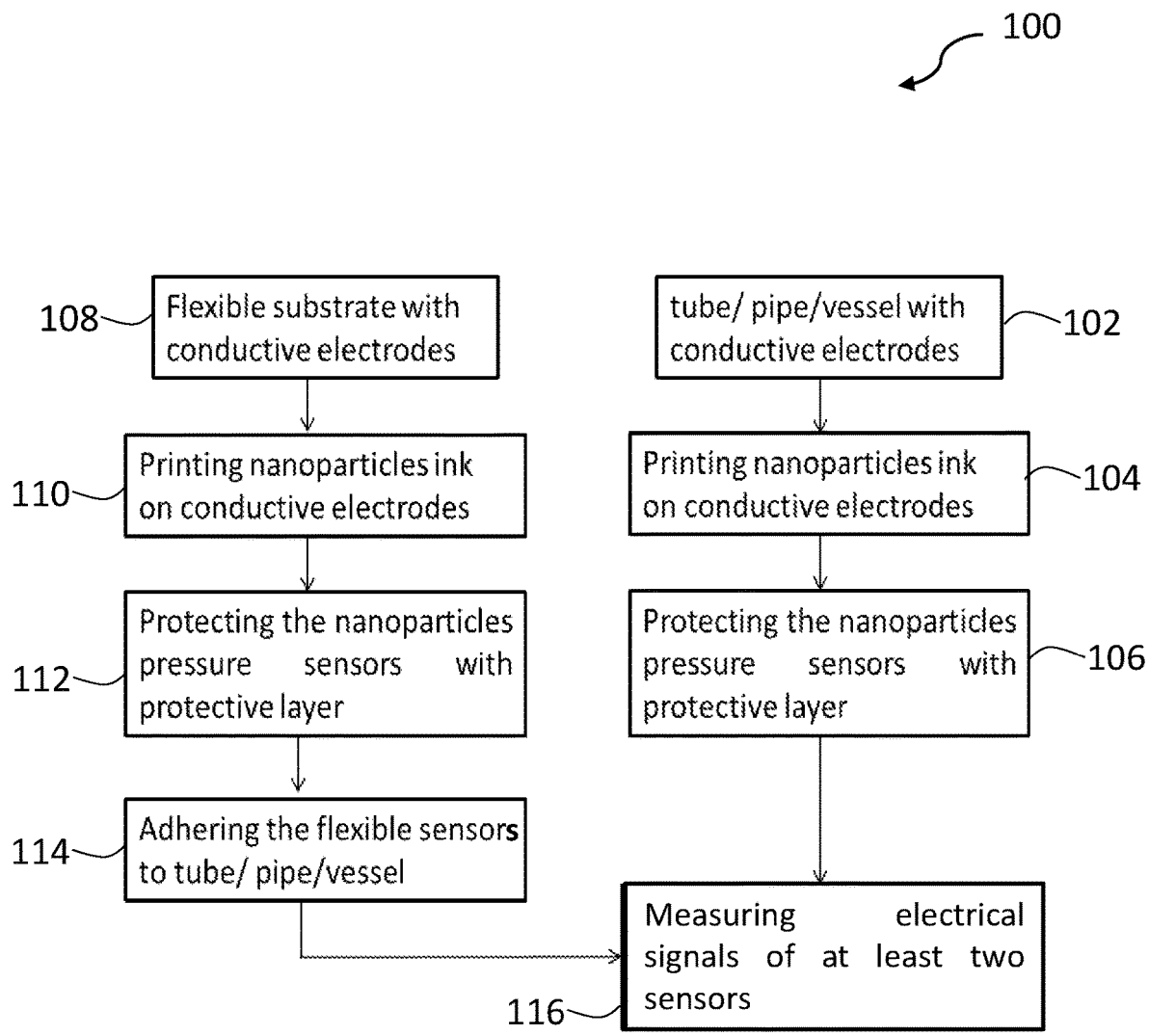
FIG. 1A is a flowchart of method 100 for fabrication of a sensing element, according to some embodiments of the present invention.

The present invention provides methods for determining a differential parameter associated with a flow of a fluid located within a fluid conduit. The invention makes use of a combination of at least two sensing elements printed on or adhered to the outer surface of a fluid conduit, such as, but not limited to, a tube, pipe, vessel, reactor or valve, or provided on an external clamping device configured to be mounted on said fluid conduit, to measure pressure and/or temperature changes, while applying the sensing elements to two locations on the fluid conduit at the same time. The present method allows determination of the time alignment of certain flow events within the fluid conduit. For example, in order to measure activation transfer time of a valve, the combination of sensing elements can be applied to an actuation pneumatic tube, pipe or vessel, and to the tube, pipe or vessel where the material flows following the valve opening (by the actuation flow tube). The sensing elements can also be connected to the inlet and outlet of the valve, whether it is a dynamic valve or a static valve, thereby enabling detection of the time to open parameter, and fluid flow rate through the valve, respectively. Additionally, pressure wave velocity, e.g., originating from opening of a valve or from pipe deterioration, can be measured by placing one sensing element at an outlet of a valve and another element at a certain distance from the valve on the downstream flow pipe.

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure. In the figures, like reference numerals refer to like parts throughout.

The method for determining a parameter associated with a flow of a fluid located within a fluid conduit comprises the use of a first and a second sensing elements.

As used herein, the terms "sensing elements", "nanoparticle-based sensors", and "nanoparticle sensors" are interchangeable, and refer to the sensing elements comprising an assembly of nanometric particles, as presented herein.

The sensing device or element is based on an assembly of nanometric particles. The nanoparticles can be metallic. Suitable metallic nanoparticles within the scope of the present invention include, but are not limited to Au, Ag, Ni, Co, Pt, Pd, Cu, Al, and combinations thereof, including metal alloys such as, but not limited to Au/Ag, Au/Cu, Au/Ag/Cu, Au/Pt, Au/Pd, Au/Ag/Cu/Pd, Pt/Rh, Ni/Co, and Pt/Ni/Fe. Each possibility represents a separate embodiment of the present invention. In some exemplary embodiments, the nanoparticles are gold (Au) nanoparticles.

The high sensitivity of the nanoparticle-based sensing elements suitable for use in the methods of the present invention and wide dynamic range thereof, enable detection of very small pressure changes (which is not possible with current strain sensing technologies) over a wide range of pressures with high accuracy and without the need for additional elements. Additionally, the nanoparticle-based sensing elements are characterized by particularly rapid response times, thereby allowing immediate detection of pressure and/or temperature changes.

The change in the measured property (e.g., electrical resistance) is determined by the change in the inter-particle distance between the nanoparticles within the nanoparticles assembly, said nanoparticles being neighboring nanoparticles of the same nanoparticles layer and/or nanoparticles of adjacent nanoparticle layers within the nanoparticles assembly. In some embodiments, the electrical signal is produced by the sensing elements by the swelling of the assembly of nanoparticles in response to changes in pressure or temperature. As used herein, the term "swelling" refers to an increase of the average inter-particle distance in the assembly of nanoparticles. In other embodiments, the electrical signal is produced by the aggregation of the assembly of nanoparticles in response to changes in pressure or temperature. As used herein, the term "aggregation" refers to a decrease of the average inter-particle distance in the assembly of capped nanoparticles.

According to some embodiments, the interparticle distance is highly affected by lateral strain/pressure. In certain such embodiments, the sensing element is a piezoelectric sensor. According to further embodiments, the nanoparticles are piezoresistive nanoparticles. According to some embodiments, the interparticle distance is affected by normal forces.

According to some embodiments, the metallic nanoparticles are capped with an organic coating, for example, to ensure long time stability and/or to enhance the sensor signal. The organic coating of the metallic nanoparticles comprises a monolayer or multilayers of organic molecules. Suitable coating includes, but is not limited to alkylthiols, e.g., alkylthiols with C3-C24 chains, arylthiols, alkylarylthiols, alkenyl thiols, alkynyl thiols, cycloalkyl thiols, heterocyclyl thiols, heteroaryl thiols, alkylthiolates, alkenyl thiolates, alkynyl thiolates, cycloalkyl thiolates, heterocyclyl thiolates, heteroaryl thiolates, w-functionalized alkanethiolates, arenethiolates, (ω-mercaptopropyl)trimethyloxysilane, dialkyl disulfides and combinations thereof. Each possibility represents a separate embodiment of the present invention. In various embodiments, the organic coating is characterized by a thickness ranging from about 1 nm to about 1000 nm. In further various embodiments, the organic coating is characterized by a thickness ranging from about 1 nm to about 250 nm, about 50 nm to about 750 nm, about 1 nm to about 500 nm, or about 100 nm to about 800 nm. Each possibility represents a different embodiment of the present invention.

In some embodiments, the sensing element further comprises a plurality of conducting electrodes. In certain such embodiments, the nanoparticle assembly is coupled to said electrodes, i.e., being in electric contact therewith, thereby enabling the measurement of the signals generated by the nanoparticle assembly. The sensing element can include two, three or more electrodes. Different configurations of the electrodes may be fabricated as is known in the art. The distance between adjacent electrodes defines the sensing area. Typically, the distance between adjacent electrodes in each sensing element ranges between about 0.01 mm to about 5 mm. In some embodiments, the sensing element comprises interdigitated electrodes. The nanoparticle assembly can be disposed upon the electrodes, covering at least a portion of each electrode, or between the electrodes. Each possibility represents a separate embodiment of the invention. The conducing electrodes may comprise metals such as Au, Ag, Pt, and alloys thereof, and may further be connected by interconnecting wiring.

According to further embodiments, the first sensing element is in contact with a first position on an exterior of a fluid conduit and the second sensing element is in contact with a second position on the exterior of the fluid conduit. In further embodiments, the first and the second sensing elements do not contact the fluid within the conduit. Advantageously, the present invention provides a method for determining a parameter associated with a flow of a fluid located within a fluid conduit, wherein the sensing elements do not contact the fluid directly, and therefore do not pose a contamination hazard to the fluid, as opposed to other sensing methods involving direct contact.

According to some embodiments, the lateral strain is affected by the pressure changes between the fluid flowing within the fluid conduit and the inner surface of the fluid conduit. In order to measure the lateral strains associated with pressure changes of the fluid within the fluid conduit or temperature changes thereof as a result of flow changes therewithin, the nanoparticle-based sensing element can be printed on or adhered to the external surface of the fluid conduit. Alternatively, the nanoparticles can be supported on an essentially flexible substrate. Said substrate can be adhered to the exterior of the fluid conduit or, alternatively, support the nanoparticles assembly and/or conductive electrodes, which contact the fluid conduit during the measurement step.

The substrate suitable for use in the sensing elements implemented in the methods of the present invention should be substantially flexible. According to some embodiments, the substantially flexible substrate is made of an electrically insulating polymeric material. Such substantially flexible substrates include stretchable substrates as is known in the art, e.g., polymers which may be polyimide (e.g. Kapton®), polyamide, polyimine (e.g. polyethylenimine), polyethylene, polyester (e.g. Mylar®, polyethylene terephthalate, polyethylene naphthalate), polydimethylsiloxane, polyvinyl chloride (PVC), polystyrene and the like; or silicon-based substrates, such as, silicon dioxide or Si rubber. Each possibility represents a separate embodiment of the present invention.

The substantially flexible substrate can have any desirable geometry, which is compatible with the fluid conduit and the nanoparticles assembly shape. The thickness of the substrate can range from about 1 micrometer to about 1000 micrometers. According to some embodiments, the thickness of the substrate is in the range of about 1 micrometer to about 100 micrometers, about 100 micrometers to about 200 micrometers, about 200 micrometers to about 300 micrometers, about 300 micrometers to about 400 micrometers, about 400 micrometers to about 500 micrometers, about 500 micrometers to about 600 micrometers, about 600 micrometers to about 800 micrometers, or about 800 micrometers to about 1000 micrometers. Each possibility represents a separate embodiment of the present invention. According to further embodiments, the thickness of the substrate is in the range of about 5 micrometers to about 500 micrometers.

According to some currently preferred embodiments, the sensing element has a thin-film structure. The thin film configuration of the nanoparticle sensors prevents or substantially diminishes delamination of the sensing elements from the surface of the fluid conduit which results from either shear stresses induced by lateral strains associated with the pressure changes and/or normal stresses induced by the elastic bending force of the sensing element in the case of curved surfaces.

The nanoparticles within said sensing element can be arranged in well-ordered two- or three-dimensional assemblies, i.e., the assembly of nanoparticles can include a monolayer or multiple layer of nanoparticles. The nanoparticles assembly can have any shape or surface area suitable for attaching the sensing element to the fluid conduit. The nanoparticles assembly can further have a specific pattern, which can be disposed between a pair of conductive electrodes. The electrical contact between the nanoparticles assembly and the electrodes can be obtained with or without printing any part of the pattern on one or more conductive electrodes of the pair.

The assembly of nanoparticles can be formed on the substrate, the conductive electrodes, and/or the fluid conduit by means of any technique suitable for depositing nanoparticle inks. Non-limiting examples of suitable deposition techniques include inject printer printing, 3D printing, random deposition from solution of nanoparticles on solid surfaces, field-enhanced or molecular-interaction-induced deposition from solution of nanoparticles on solid surfaces, Langmuir-Blodgett or Langmuir-Schaefer techniques, soft lithographic techniques, such as micro-contact printing (mCP), replica molding, micro-molding in capillaries (MIMIC), and micro-transfer molding (mTM), and combinations thereof. Each possibility represents a separate embodiment of the present invention.

The conducting electrodes can be formed on the exterior of the fluid conduit or the substrate by depositing a conductive ink, such as for example, AgCite from Nanodimension, by inject printing or 3D printing. Photonic sintering (e.g., by Xenon) can be performed in order to sinter the electrodes and make them conductive.

The assembly of nanoparticles and the conductive electrodes can further be printed on or attached to (with a suitable adhesive material) to an inner surface of a clamping device, as detailed hereinbelow in connection with FIGS. 3A-3F.

The sensing element can further include a protective coating. The protective coating can be configured to protect the nanoparticles assembly from external stimuli, such as, for example, humidity or adsorption of volatile organic compounds. The protective coating can further be used to ensure structural and mechanical integrity of the nanoparticles assembly during prolonged sensing periods, in particular where the nanoparticles are not supported on a substrate or wherein the sensing elements are attached to the fluid conduit through the substrate and not through the nanoparticles assembly. Typically, the protective coating comprises a polymer such as, but not limited to: polydimethylsiloxane (PDMS), polyurethane, parylene, fluoropolymer, and/or other suitable materials such as acrylic fibers, epoxy, silicone, combinations thereof, or any other suitable polymer/material that is known in the art.

According to some embodiments, the first and the second sensing elements are directly fabricated on the exterior surface of the fluid conduit, wherein the nanoparticles and the conductive electrodes are directly connected or adhered to the exterior surface of the fluid conduit. According to some embodiments, the first and the second sensing elements are indirectly attached on the exterior surface of the fluid conduit through a substrate, wherein the nanoparticles and the conductive electrodes are connected or adhered to said substrate, and the substrate is connected or adhered to the exterior surface of the fluid conduit.

According to some embodiments, the first and the second sensing elements are disposable. According to further embodiments, the first and the second sensing elements are configured for single use. According to some other embodiments, the first and the second sensing elements are reusable. According to further such embodiments, the first and the second sensing elements are configured for multiple uses. According to some related embodiments, the first and the second sensing elements are configured for be detachably attached to the exterior surface of the fluid conduit.

According to some embodiments, the first and the second sensing elements are configured to undergo sterilization processes, wherein sterile conditions or special regulations are required. Such sterilization processes can be selected from, but not limited to, gamma radiation, steam or high temperature processes, chemicals treatments, combinations thereof, or any other suitable process known in the art.

According to some embodiments, the first and the second sensing elements are configured to undergo gamma radiation for sterilization applications, wherein the gamma radiation does not significantly affect the sensing elements sensitivity and measured electrical signals. The gamma radiation can be applied to the sensing elements following direct fabrication on the exterior surface of the fluid conduit, or prior to indirect attachment to the exterior surface of the fluid conduit through a substrate. Advantageously, according to some embodiments, the present invention provides accurate sensing elements suitable for sterilization processes, wherein the sensing elements are not significantly affected thereby, and therefore are suitable for providing accurate electrical signals, wherein sterile conditions or special regulations are required. As used herein, the term "significantly" refers to a variation of less than 1%, preferably less than 0.5%, or more preferably less than 0.1%, in the measured electrical signals of the sensing elements, when compared between before and after undergoing a sterilization process.

According to some embodiments, the method of the present invention is configured for determining a parameter associated with a flow of a fluid located within a fluid conduit, wherein said fluid conduit is a part of a pharmaceutical manufacturing or testing equipment.

Reference is now made to FIG. 1A, illustrating a flowchart of method 100 for the provision of a sensing element for use in the method for determining a parameter associated with a flow of a fluid located within a fluid conduit, according to some embodiments of the present invention.

Method 100 can be utilized for direct fabrication of the sensing element on the exterior surface of the fluid conduit. According to some embodiments, method 100 comprises step 102 of providing a fluid conduit (e.g., a vessel, a pipe, a reactor, or a tube) and forming at least two conductive electrodes as presented herein on the external surface thereof. According to further embodiments, method 100 further comprises step 104 of providing an assembly of nanometric particles as presented herein and coupling them to the at least two conductive electrodes, wherein the assembly of nanometric particles is disposed upon the electrodes and/or between the electrodes utilizing suitable deposition techniques as presented herein above. According to further embodiments, method 100 further comprises step 106 of depositing a protective coating (layer) upon the assembly of nanometric particles and the electrodes, wherein said protective coating is configured to protect the nanoparticles assembly from external stimuli and/or mechanical damage. According to some embodiments, step 106 further comprises providing gamma radiation for sterilization applications to the first and the second sensing elements.

Alternatively, method 100 can be utilized for indirect fabrication of the sensing element, wherein the sensing element is attached to the exterior surface of the fluid conduit through a substrate. According to some embodiments, method 100 comprises step 108 of providing a flexible substrate as presented herein and forming at least two conductive electrodes thereon. According to further embodiments, method 100 further comprises step 110 of providing an assembly of nanometric particles as presented herein and coupling them to the at least two conductive electrodes, wherein the assembly of nanometric particles is disposed upon the electrodes and/or between the electrodes utilizing suitable deposition techniques as presented herein above. According to further embodiments, method 100 further comprises step 112 of depositing a protective coating (layer) upon the assembly of nanometric particles and the electrodes, wherein said protective coating is configured to protect the nanoparticles assembly from external stimuli and/or mechanical damage. According to some embodiments, step 112 further comprises providing gamma radiation for sterilization applications to the first and the second sensing elements. According to further embodiments, method 100 further comprises step 114 of adhering the flexible substrate to the external surface of the fluid conduit via application of suitable attachment materials, such as glues, resins, pastes and the like. Additionally or alternatively, the flexible substrate can comprise an adhesive material. According to still further embodiments, the sensing element can be detachably attached to the external surface of the fluid conduit, wherein the flexible substrate can be removed and reapplied thereto a plurality of times. Alternatively, the first and the second sensing elements can be attached to the external surface of the fluid conduit, such that the nanoparticles assembly faces the fluid conduit, via application of suitable attachment materials, such as glues, resins, pastes and the like.

According to some embodiments, step 106 and step 114 separately leads to step 116 of measuring the electrical signals generated by the first and the second sensing elements, wherein the electrical signal can be electrical resistance.

Figure 1B:
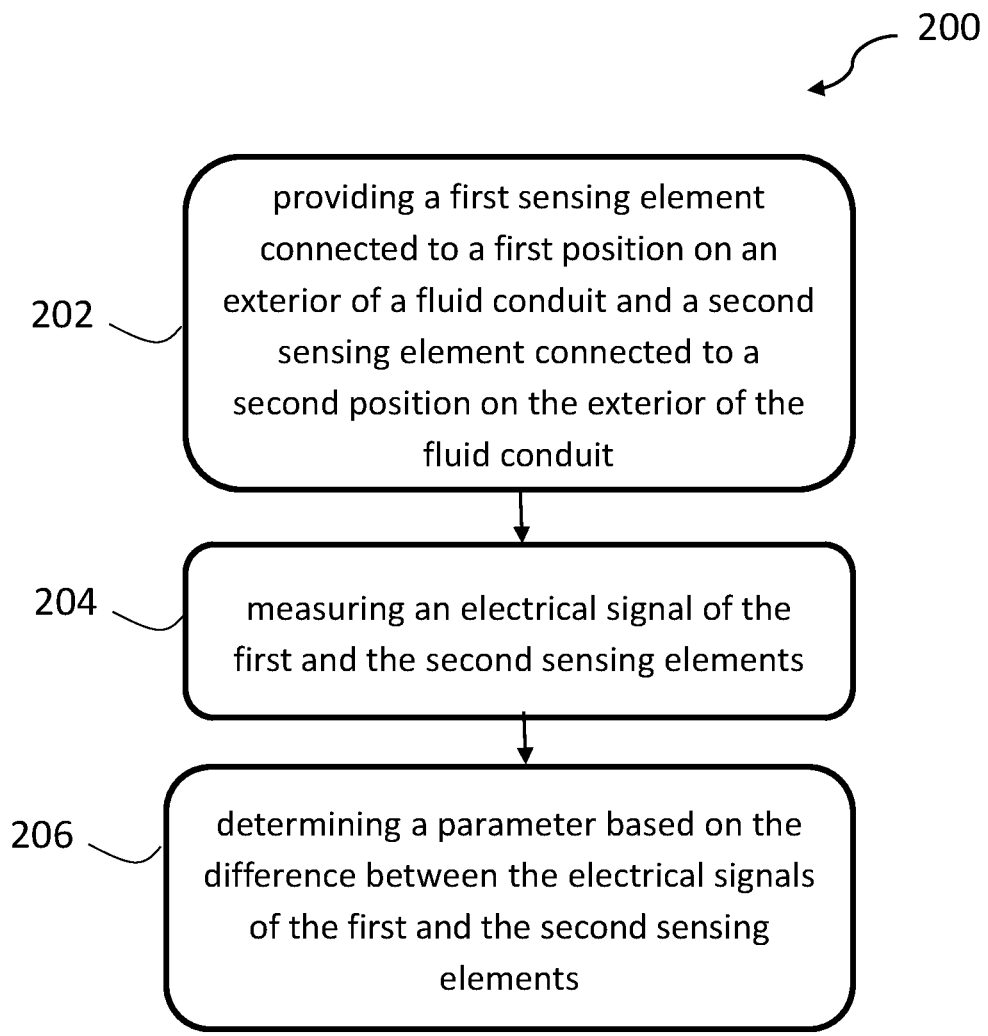
FIG. 1B is a flowchart of method 200 for determining a parameter associated with a flow of a fluid located within a fluid conduit based on the difference between electrical signals of at least two sensing elements, according to some embodiments of the present invention.

Reference is now made to FIG. 1B showing a flowchart of method 200 for determining a parameter associated with a flow of a fluid located within a fluid conduit, based on the difference between electrical signals of at least two sensing elements, according to some embodiments of the present invention.

According to some embodiments, method 200 comprises step 202, which comprises providing a plurality of sensing elements, wherein each sensing element comprises an assembly of nanoparticles disposed between conductive electrodes. According to further embodiments, each one of the plurality of sensing elements is in contact with a different position on the exterior of the fluid conduit. In some embodiments, the plurality of sensing elements comprises a first and a second sensing elements. In certain embodiments, the first sensing element contacts a first position on the exterior of the fluid conduit and the second sensing element contacts a second position on the exterior of the fluid conduit.

The term "contact", as used herein in connection with the sensing elements and the fluid conduit, refers to a connection between the first and the second sensing elements to the exterior of the fluid conduit in which at least one of the first and/or the second sensing elements are directly fabricated on an exterior surface of the fluid conduit; to a connection between the first and the second sensing elements to the exterior of the fluid conduit in which at least one of the first and/or the second sensing elements are attached to an exterior surface of the fluid conduit with a suitable adhesive agent; to a connection between the first and a second sensing elements to the exterior of the fluid conduit in which at least one of the first and/or the second sensing elements are indirectly attached on the exterior surface of the fluid conduit through a substrate; or to a connection between the first and a second sensing elements to the exterior of the fluid conduit in which a first surface of the at least one of the first and/or the second sensing elements is in physical contact with the exterior surface of the fluid conduit, while the opposite surface of the at least one of the first and/or the second sensing elements is attached to an external device, such as, but not limited to, a clamping device or a rigid proof body.

The sensing elements can contact the fluid conduit at different positions, as dictated by the type of the measurement and the fluid parameter to be obtained. For example, when measuring activation transfer time of a valve, the sensing elements should be placed in close proximity to each other, i.e., in proximity to the valve inlet and outlet. The placement of the sensing elements on the exterior of the fluid conduit at different positions can be dependent on the cross-sectional diameter of the fluid conduit and the pressures of the fluid residing therein. The terms "close proximity", and "vicinity", as used herein interchangeably, refer to a distance of less than about 20 times, preferably less than about 15 times, or more preferably less than about 10 times the cross-sectional diameter of the valve's outlet. When measuring the fluid flow rate, wherein the second sensing element is in contact with a second position on the fluid conduit, which is located on the downstream after the fluid conduit having a smaller diameter, the distance of the second sensing element therefrom can range from about 0.1 times the cross-sectional outlet diameter to about 10 times the cross-sectional outlet diameter.

When measuring the pressure wave velocity, the sensing elements should be placed at a certain distance therebetween, which is sufficient for the formation of the pressure wave. According to some embodiments, the distance between the first position on the exterior of the fluid conduit and the second position on the exterior of the fluid conduit when measuring the pressure wave velocity ranges from about 1 cm to about 10 meter, from about 10 meter to about 200 meter, from about 200 meter to about 400 meter, from about 400 meter to about 600 meter, from about 600 meter to about 800 meter, or from about 800 meter to about 1000 meter. Each possibility represents a separate embodiment of the present invention.

As used herein, the term "fluid conduit" refers to a receptacle configured to hold a fluid (even if temporarily), wherein the fluid can flow through said receptacle. The receptacle can be selected from a container, a tube, a pipe, a duct, a hose, a catheter, a shaft, a chamber, a vessel, a reactor, a pipeline or a system of pipes, and variations thereof and combinations thereof. Each possibility represents a separate embodiment. The receptacle can further contain a valve, a sealing, or a flange. The fluid conduit can be made from silicon, polyurethane, PVC, glass, a metal or metal alloy, combinations thereof, and other suitable materials. Each possibility represents a separate embodiment. According to some embodiments, the fluid conduit is configured to expand and/or contract in a radial direction to a certain degree, as a result of the fluid flowing therethrough and exerting pressure thereon. According to some embodiments, the fluid conduit comprises at least one pipe and/or at least one vessel. According to some embodiments, the fluid conduit comprises at least two pipes fluidly connected via a valve, a flange, a sealing, or any other component suitable for connecting two pipes. According to some embodiments, the fluid conduit comprises a plurality of pipes fluidly connected to each other. According to some embodiments, the fluid conduit comprises at least one pipe fluidly connected to at least one valve. According to some embodiments, the first position and the second position are located on the same pipe. According to some embodiments, the first position and the second position are located on two different fluidly connected pipes. According to some embodiments, the first position and the second position are located on the same vessel. According to some embodiments, the first position and the second position are located on two different fluidly connected vessels.

The terms "pipe" and "tube" are used herein interchangeably and refer to a hollow tubular conduit configured for the conveyance of liquids or gases. Unless specified otherwise, the pipe or tube have an essentially round cross-section.

The valve can be a static valve, or a dynamic valve. The term "static valve", as used herein, refers in some embodiments, to a valve, which is configured to be continuously open. In additional embodiments, the term "static valve" refers to a valve which is at least partially open during the measurement step of method 200. The term "dynamic valve", as used herein, refers to a valve, which is configured to be opened or closed by at least one of a user, a control system, or a controller. According to some embodiments, the valve is selected from a pneumatic valve, a hydraulic valve, a ball valve, a butterfly valve, a choke valve, a diaphragm valve (membrane valve), a gate valve, a globe valve, a knife valve, a needle valve, a pinch valve, a piston valve, a plug valve, a spool valve, a solenoid valve, or any other valve known in the art. Each possibility represents a separate embodiment of the invention. In some exemplary embodiments, the valve is a dynamic pneumatic actuator valve.

According to some embodiments, the sensing elements are placed in proximity to the valve inlet and outlet. The terms "valve inlet" and "inflow section" are used herein interchangeably and refer to the section within the fluid conduit located prior to the valve in proximity thereto, in the downstream direction. The terms "valve outlet" and "outflow section" are used herein interchangeably and refer to the section within the fluid conduit located after to the valve in proximity thereto, in the downstream direction.

According to some embodiments, the pipe and/or the vessel comprises a sealing between the first position and the second position. The sealing can be an obstruction or a partial blockage inside the pipe and/or the vessel, which decreases the inner (cross-sectional) diameter of the pipe. The sealing can be selected from a nozzle, a filter, a gasket, an orifice, a flow restrictor, combinations thereof, or any other suitable object that can decrease the diameter of the pipe. Each possibility represents a separate embodiment. The sealing can be a connection point between two pipes or vessels, wherein the two pipes or vessels have the same or different diameters and/or shapes.

According to some embodiments, the fluid conduit comprises a pipe comprising at least two different diameters. According to further embodiments, the pipe comprises a first section having a first cross section diameter and a second section having a second cross section diameter, wherein the first cross section diameter is different from the second cross section diameter, and wherein the first position is located on the exterior of the first section of the pipe, and the second position is located on the exterior of the second section of the pipe. The difference in cross section diameters can be imposed by an external device, such as, for example, clamping device. The clamping device can be attached to the first section of the pipe and/or the second section of the pipe.

According to some embodiments, the fluid conduit comprises a Venturi tube or pipe. As used herein, the terms "Venturi tube" or "Venturi pipe" are interchangeable, and refer to a tube having varying cross section diameters along its length, wherein a fluid flows through the inner length of the Venturi tube, and its properties (e.g., pressure, velocity, etc.) change according to the changes in the diameter thereof. As used herein, the term "Venturi effect" refers to the reduction in fluid pressure occurring when a fluid flows through a constricted section in a pipe. Typically, the cross-section of Venturi tubes contracts from a first diameter section to a smaller diameter (the throat section) and then gradually expands, wherein the fluid flows through the throat section, the smaller diameter section will accelerate the fluid accompanied by a pressure drop. By measuring the pressure difference between the throat section and the first diameter section, the Venturi pipe can be applied to measure the fluid flow velocity and rate.

According to some embodiments, the Venturi tube or a Venturi configuration (i.e., a fluid conduit forming the Venturi effect) is characterized by having a first fluid conduit section characterized by having a first diameter, a second fluid conduit section (also termed herein the "throat section") characterized by having a second diameter, and a third fluid conduit section characterized by having the third diameter. According to further embodiments, the third diameter is identical to the first diameter. According to still further embodiments, the third diameter is different from the first diameter. According to further embodiments, the second diameter is smaller than the first and the third diameters. According to further embodiments, the first position is located on the exterior of the first fluid conduit section, and the second position is located on the exterior of the second fluid conduit section. According to still further embodiments, the first sensing element is connected to the first position on the exterior of the first fluid conduit section, and the second sensing element is connected to the second position on the exterior of the second fluid conduit section (throat section). According to yet further embodiments, the second fluid conduit section (throat section) is selected from a sealing, a gasket, valve, a flange, a tube, an orifice, a filter, and combinations thereof. Each possibility represents a separate embodiment.

According to some embodiments, method 200 further comprises step 204 of measuring an electrical signal of the first and the second sensing elements. According to some embodiments, the electrical signal is responsive to at least one of pressure and temperature. According to some embodiments, the measurement of the electrical signals of the first and the second sensing elements is performed simultaneously. The term "measurement", as used herein is meant to encompass a single measurement, a series of discreet measurements, as well as a continuous measurement, i.e., continuous monitoring of the electrical signal. In some exemplary embodiments, the electrical signal of the first and the second sensing elements is measured and/or recorded as a function of time. In some embodiments, the electrical signal is measured in time increments of less than about 100 milliseconds.

According to some embodiments, the electrical signal is selected from electrical resistance, conductance, alternating current (AC), electrical potential and combinations thereof. Each possibility represents a separate embodiment. The electrical signal can be detected by a suitable detection device, measuring device or electronic circuitry. Thus, in some embodiments, the first sensing element, the second sensing element or both are coupled to the signal detection and/or measuring device. Suitable detection and/or measuring devices should be susceptible to a change in at least one of resistance, conductance, AC, electrical potential or combinations thereof. Changes in the electric properties of the sensing elements can be measured by any suitable device known in the art, including, inter alia, a data logger, a potentiostat, a voltmeter, a conductivity meter, an LCR meter or a multimeter.

According to some exemplary embodiments, the electrical signal is electrical resistance. The electrical resistance of the first sensing element can be measured simultaneously with the electrical resistance of the second sensing element.

According to some embodiments, method 200 further comprises step 206 of determining, based on the difference between the electrical signals of the first and the second sensing elements, the parameter associated with a flow of a fluid located within the fluid conduit. The term "difference between the electrical signals", as used herein, refers to a difference in one or more of the following: a value of the electrical signal, a change of value of the electrical signal, a pattern of values of the electrical signal over time, a deviation of a value of the electrical signal from an expected value, an event represented by the value of the electrical signal, an event represented by a change in the value of the electrical signal, a deviation of a change of value of the electrical signal from an expected change of value, and a deviation of a pattern of values of the electrical signal over time from an expected pattern of values over time.

The difference between the electrical signals of the first and the second sensing elements can be determined by comparing said electrical signals. The electrical signals can be compared by a binary mathematical operation, e.g., subtraction. For example, if the measurement of the electrical signal comprises a single measurement or a plurality of discreet measurements, such measured signals can be compared. Various algorithms, including pattern recognition algorithms, can further be used to compare the electrical signals of the two sensing elements, in particular, wherein said signals are time-related patterns.

The electrical signals, which are compared in step 206 to find a difference therebetween, can include the value of the measured electrical resistance, which can be further normalized by a baseline resistance. Additionally or alternatively, time related electrical resistances of the sensing elements can be compared, i.e., a time at which each of the sensing elements detected a particular electrical resistance value. For example, times at which the sensing elements have detected the highest resistance values, can be compared. In further embodiments, the electrical signals, which are compared, comprise a time of occurrence of a change in the measured electrical signal. Said occurrence of a change in the measured electrical signal can represent a specific event associated with the flow of the fluid within the conduit, e.g., opening or closing of a valve.

As used herein, the term "change" refers to an increase or a decrease in the measured electrical signal (e.g., electrical resistance). The term "change" can further refer to the onset of the increase or decrease in the measured electrical signal, the steady state of the increase or decrease, or any point between the onset and the steady state.

According to further embodiments, the change in the measured electrical signals is produced by the swelling or the aggregation of the assembly of nanoparticles as presented herein in response to changes in at least one of pressure and temperature of the fluid flowing within the fluid conduit. According to still further embodiments, the swelling or the aggregation of the assembly of nanoparticles is highly associated with changes of shear stresses induced by lateral strains between the inner surface of the fluid conduit (fluid conduit wall) and the fluid flowing therein. According to still further embodiments, the electrical signal is proportional to the amount of deflection of fluid from the fluid conduit wall. According to still further embodiments, the electrical signal is proportional to the normal forces that are attributed to the pressure applied on the fluid conduit due to the pressure that is applied on the tube walls by the fluid. Without wishing to being bound by theory or mechanism of action, when normal forces are applied to the sensing element comprising at least two layers of nanoparticles in the orthogonal direction to the sensing element substrate and/or the fluid conduit wall, the interparticle distance between the nanoparticles of the at least two layers is decreased, resulting in the decrease in the measured resistance.

In some embodiments, the difference between the electrical signals of the first and the second sensing elements is determined by comparing electrical signal patterns of the first and the second sensing elements. For example, if the electrical signal of the sensing elements is monitored continuously, a pattern of the sensing element response as a function of time can be obtained. Such electrical signal patterns of the first and the second sensing elements can be compared, for example, to obtain a difference between the maximal and/or minimal amplitudes of the electrical signals of the first and the second sensing elements. Additionally, the electrical signal patterns of the first and the second sensing elements can be compared to obtain a time difference between specific electrical signal measured amplitudes, e.g., a time difference between maximal and/or minimal amplitudes of the electrical signals of the first and the second sensing elements. The term "minimal amplitude", as used herein, refers to an amplitude, which is lower than all other measured amplitudes but higher than background signal and/or zero.

In some embodiments, the electrical signals of the first and the second sensing elements, which are compared in step 206, are the values of the electrical resistance. In some embodiments, the difference between the electrical signals of the first and the second sensing elements ranges between about 0.01% to about 1% of the average electrical signal of the first and the second sensing elements. It is therefore prerequisite that the sensing elements have high sensitivity towards minimal pressure fluctuations, to enable the determination of the parameter of interest based on the difference between the electrical signals of the first and the second sensing elements. Advantageously, the nanoparticle-based sensing elements for use in the methods of the present invention are characterized by strain (e.g., lateral strain) measurement sensitivity of at least about 10 gauge factor (GF). As used herein, the term "gauge factor" refers to the ratio between the sensor response (e.g., the relative change in electrical resistance) and the strain. The electrical signal amplitude of the sensing elements can be further enhanced by exerting pressure on at least one of the first and the second positions on the fluid conduit and/or using a designated clamping device, as detailed hereinbelow with respect to FIGS. 3A-3F.

According to some exemplary embodiments, said difference between the electrical signals of the first and the second sensing elements is a time related difference between the occurrence of a change in the measured electrical signals of the first and the second sensing elements. According to further embodiments, the electrical signal is a time related resistance, and the difference between the electrical signals of the first and the second sensing elements ranges between about 10 milliseconds to about 10 seconds. It is therefore prerequisite that the sensing elements have a very rapid response time to enable the determination of the parameter of interest based on the time related difference between the electrical signals of the first and the second sensing elements. According to some embodiments, the first and the second sensing elements have a response time of less than about 1 second, preferably less than about 70 milliseconds, or more preferably less than about 40 milliseconds.

As used herein, the term "response time" refers to the time duration between the onset of a change within the fluid conduit (e.g., the activation of the valve) and the initial response of the first and the second sensing elements resulting in the detection of pressure and/or temperature changes therewithin. Advantageously, the nanoparticle-based sensing elements for use in the methods of the present invention have very short response times, thereby allowing essentially immediate detection of pressure and/or temperature changes within the fluid conduit.

Advantageously, according to some embodiments, the method of the present invention as presented herein enables an accurate and rapid determination of a differential parameter associated with the flow of a fluid within a fluid conduit, wherein the differential parameter can be selected from, but not limited to, activation transfer time of a valve, including steady state flow; flow rate and/or velocity of the fluid through the fluid conduit; pressure wave velocity, and combinations thereof. Each possibility represents a separate embodiment of the present invention.

According to some embodiments, the parameter associated with a flow of a fluid located within a fluid conduit is indicative of an activation transfer time of a valve. As used herein, the terms "activation transfer time" or "time to open" are interchangeable, and refer to the time difference between the moment a control actuation has started (i.e., the initial time at which the activation of the valve has started) and the actual time the fluid flow started to change following the departure of the fluid from the valve. For example, if a pneumatic actuator valve is operationally connected to a pipe, a first sensing element can be placed on the pipe supplying the compressed fluid to the pneumatic actuator (also termed herein "pneumatic line"), configured to activate an actuation piston or actuator operating as the valve, and a second sensing element can be placed on the pipe along the downstream exhaust outlet section following the valve. By simultaneously measuring the electrical signals generated by the first and the second sensing elements, and assessing the time difference between the electrical signals of the sensing elements, which indicate a change in the flow of the fluid within said pipes, the activation transfer time of the pneumatic actuator valve can be determined, thus indicating the response time or delay of the pneumatic actuator valve. This parameter can be crucial for various processes, and specifically for chemical, biological, or medical processes where the accuracy of the response time of the valve is crucial for the accuracy of the manufacturing process and/or the characteristics and quality of the product. According to some embodiments, the first sensing element is placed on the pneumatic line and the second sensing element is placed on the downstream outlet, wherein the valve is changed from a closed position to an open position, and wherein both the first and the second sensing elements are configured to indicate an increase in the pressure of the fluid due to the opening of the valve.

In order to determine activation transfer time of a valve in a fluid conduit comprising a first pipe and a second pipe fluidly connected by said valve, the first sensing element can be connected to the first pipe in close proximity to a valve inlet (i.e., the first position on the fluid conduit is on the first pipe) and the second sensing element can be connected to the second pipe in close proximity to a valve outlet (i.e., the second position on the fluid conduit is on the second pipe). By simultaneously measuring the electrical signals generated by the first and the second sensing elements, and assessing the time difference between the electrical signals of the sensing elements, which indicate a change in the flow of the fluid within the first and the second pipes, the activation transfer time of the valve can be determined.

Without wishing to being bound by theory or mechanism of action, it is contemplated that in certain such embodiments, the change in the electric signal of the first sensing element indicates a decrease in the pressure of the fluid due to the opening of the valve and the change in the electric signal of the second sensing element indicates an increase in the pressure of the fluid due to the opening of the valve.

According to some embodiments, the parameter associated with a flow of a fluid located within a fluid conduit is indicative of a steady state downstream flow duration following activation of the valve.

As used herein, the terms "steady state downstream flow duration" or "steady state flow" are interchangeable, and refer to the time duration during which the fluid flows through the fluid conduit after exiting the valve. Said parameter can be calculated by subtracting the activation transfer time from the time period during which the fluid flows through the fluid conduit between two subsequent valve operations (i.e., opening and closing). The time period during which the fluid flows through the fluid conduit is characterized by the electric signal of the second sensing element, which is higher than zero or than the background signal.

According to some embodiments, the parameter associated with a flow of a fluid located within a fluid conduit is indicative of a flow rate and/or velocity of the fluid flowing through the fluid conduit and/or the valve. According to further embodiments, the parameter is indicative of the flow rate and/or flow velocity of the fluid flowing through a Venturi tube or a fluid conduit in which the Venturi effect is observed. Venturi effect can be observed in a fluid conduit, which has at least two different cross-sectional diameters, such as, for example, a pipe fluidly connected to a pipe or a pipe comprising a sealing, said fluid conduit thereby exhibiting pressure difference between the valve and the pipe or between the sealing and the pipe.

According to some embodiments, wherein the parameter is a fluid flow rate, the fluid conduit comprises a first fluid conduit having a first cross-sectional diameter and a second fluid conduit having a second cross-sectional diameter, wherein the second cross-sectional diameter is smaller than the first cross-sectional diameter. According to further embodiments, the first position is located on the first fluid conduit and the second position is located on the second fluid conduit. It is to be understood that the terms "first fluid conduit" and "second fluid conduit", as used herein, can refer to distinct components of a pipeline connected therebetween or to different portions of a single pipe or vessel. In some embodiments, the fluid flows from the first fluid conduit to the second fluid conduit. The distance between the first position and the second position can range from about 0.1 times the first or second fluid conduit cross-sectional diameter to about 10 times the first or second fluid conduit cross-sectional diameter.

According to some related embodiments, the first fluid conduit comprises a pipe and the second fluid conduit comprises at least one of a valve, a flange, a sealing, an orifice plate, a filter, a nozzle, combinations thereof, or other pipeline components which can limit or diminish the cross-sectional diameter of the pipe. The valve can be a static valve or a dynamic valve. In certain embodiments, the valve is a static valve. In further embodiments, said static valve is an open valve, through which the fluid flows within the fluid conduit.

According to additional related embodiments, the first fluid conduit and the second fluid conduit comprise a pipe, wherein the cross-sectional diameter of the second fluid conduit is diminished by mounting a clamping device on the second fluid conduit. The clamping device can be mounted both on the first fluid conduit and on the second fluid conduit, while keeping the second cross-sectional diameter smaller than the first cross-sectional diameter. According to some embodiments, the first and/or the second sensing elements are attached to or printed on the exterior of the fluid conduit. According to other embodiments, the first and/or the second sensing elements are attached to or printed on an inner surface of the clamping device. Preferably, in certain such embodiments, the first fluid conduit and the second fluid conduit are in direct contact with the inner surface of the clamping device. The clamping device can include at least one recess extending radially outward (e.g., a groove), which is configured to allow expansion of the fluid conduit into said recess and to have a partial contact with at least one sensing element. The structure and operation principles of the clamping device are detailed hereinbelow in connection with FIGS. 3A-3F.

According to some embodiments, wherein the parameter is a fluid flow rate, the fluid conduit comprises a first fluid conduit having a first cross-sectional diameter, a second fluid conduit having a second cross-sectional diameter, and a third fluid conduit having a third cross-sectional diameter, wherein the second cross-sectional diameter is smaller than the first cross-sectional diameter and the third cross-sectional diameter. According to further embodiments, the first fluid conduit and the third fluid conduit are fluidly connected through the second fluid conduit. According to still further embodiments, the first position is located on the first fluid conduit and the second position is located on the third fluid conduit. It is to be understood that the terms "first fluid conduit", "second fluid conduit", and "third fluid conduit", as used herein, can refer to distinct components of a pipeline connected therebetween or to different portions of a single pipe or vessel. The distance between the first position and the second position can range from about 0.1 times the first or second fluid conduit cross-sectional diameter to about 10 times the first or second fluid conduit cross-sectional diameter, and the distance between the second position and the third position can range from about 0.1 times the second or third fluid conduit cross-sectional diameter to about 10 times the second or third fluid conduit cross-sectional diameter. In some embodiments, the fluid flows from the first fluid conduit, through the second fluid conduit to the third fluid conduit. In further embodiments, the second position is located at least 0.1 times the second fluid conduit cross-sectional diameter from the contact point between the second and the third fluid conduits.

According to some related embodiments, the first and the third fluid conduits comprise a pipe and the second fluid conduit comprises at least one of a valve, a flange, a sealing, an orifice plate, a filter, a nozzle, combinations thereof, or other pipeline component which can limit or diminish the cross-sectional diameter of the pipe. The valve can be a static valve or a dynamic valve. In certain embodiments, the valve is a static valve. In further embodiments, said static valve is an open valve through which the fluid flows within the fluid conduit.

According to additional related embodiments, the first fluid conduit, the second fluid conduit and the third fluid conduit comprise a pipe, wherein the cross-sectional diameter of the second fluid conduit is diminished by mounting a clamping device on the second fluid conduit. The clamping device can be mounted both on the first fluid conduit, the second fluid conduit, and the third fluid conduit, while keeping the second cross-sectional diameter smaller than the first cross-sectional diameter and the third cross-sectional diameter. According to some embodiments, the first and the second sensing elements are attached to or printed on the exterior of the fluid conduit. Preferably, in certain such embodiments, the first and the third fluid conduits do not directly contact the inner surface of the clamping device, such that they are allowed to expand as a result of pressure and/or temperature changes. In further such embodiments, the second fluid conduit is in direct contact with the inner surface of the clamping device. According to other embodiments, the first and the second sensing elements are attached to or printed on an inner surface of the clamping device. Preferably, in certain such embodiments, the first fluid conduit, the second fluid conduit, and the third fluid conduit are in direct contact with the inner surface of the clamping device. The clamping device can include at least one recess extending radially outward, which is configured to allow expansion of the fluid conduit into said recess and to have a partial contact with at least one sensing element. The structure and operation principles of the clamping device are detailed hereinbelow in connection with FIGS. 3A-3F.

According to some embodiments, the parameter associated with a flow of a fluid located within a fluid conduit is indicative of a pressure wave velocity (PWV). As used herein, the term "pressure wave velocity" refers to the speed at which a pressure wave propagates through the outflow section of the fluid conduit following at least one of the following pipeline components: a sealing, valve, or a flange, an orifice plate, a filter, a nozzle, combinations thereof, or any other pipeline component which can limit or diminish the cross-sectional diameter of the pipe.

The pressure wave velocity within a fluid conduit can be determined by comparing the time at which a change in pressure occurs in close proximity to the valve (at the valve inlet or outlet) and the time at which a change in pressure occurs in the downstream pipe at a certain distance from the valve. Accordingly, the first sensing element can be placed in the vicinity of the valve inlet and/or outlet and the second sensing element can be placed at a predetermined distance from the valve, which is sufficient for the formation of a detectable pressure wave. The pressure wave velocity can be determined by measuring the time related difference between the occurrence of a change in the measured electrical signals of the first sensing element and the second sensing element and dividing a distance between the first and the second sensing elements by said difference. Large differences between time related signals of the first and the second sensing elements (i.e., small pressure wave velocities) can indicate presence of structural effects and deterioration of the pipeline. The method can include providing additional sensing elements, which can be placed along the downstream pipe and which time related electrical signals versus the first sensing element can be compared to the obtained difference to map the fluid distribution within the fluid conduit. Additionally or alternatively, the obtained difference can be compared to previous values obtained from said particular fluid conduit having identical placement of the sensing elements, to further assess possible pipe degradation and/or defects.

According to some related embodiments, the fluid conduit comprises a valve and a pipe fluidly connected with the valve. In further embodiments, the fluid flows from the valve to the pipe. According to further embodiments, the first position is located on the pipe in a close proximity to the valve and the second position is located on the pipe at a distance of at least about 1 cm, preferably at least about 5 cm, or more preferably at least about 10 cm from the first position, in order to determine the pressure wave velocity. According to still further embodiments, the first position is located on the pipe in a close proximity to the valve and the second position is located on the pipe at a distance of more than about 10 cm from the first position.

According to additional related embodiments, the fluid conduit comprises a first pipe and a second pipe fluidly connected through a valve. In further embodiments, the fluid flows from the first pipe through the valve to the second pipe. According to still further embodiments, the first position is located on the first pipe in close proximity to the valve and the second position is located on the second pipe at a distance of at least about 1 cm, or preferably at least about 5 cm from the valve.

According to further related embodiments, step 202 further comprises providing a third sensing element comprising an assembly of nanoparticles being in electric contact with conductive electrodes, wherein the third sensing element contacts a third position on an exterior of the fluid conduit. According to further embodiments, step 204 further comprises measuring an electrical signal of the third sensing element, wherein the electrical signal is responsive to at least one of pressure and temperature. According to still further embodiments, step 206 further comprises determining, based on the difference between the electrical signals of the first, the second, and the third sensing elements, said parameter. According to some embodiments, the fluid conduit comprises a valve, a first pipe, and a second pipe, wherein the first and the second pipes are fluidly connected through the valve. According to further embodiments, the first position is located on the first pipe in close proximity to the valve, the second position is located on the second pipe in close proximity to the valve, and the third position is located on the second pipe at a distance of at least about 1 cm, or preferably at least about 5 cm from the second position in the downstream direction forward from the valve. Without wishing to being bound by theory or mechanism of action, it is contemplated that a time difference between the signals received from the second and the third sensing elements, with reference to the known distance between the sensing elements, can be utilized to determine or calculate the velocity of the pressure wave progressing through the second pipe.

According to some embodiments, step 206 further comprises receiving information about a relationship between values of the difference between the electrical signals of the first and the second sensing elements and values of the parameter, and wherein the determining of said parameter is based on the relationship. For example, wherein the parameter is an activation transfer time, said relationship is a direct relationship between the difference in the time of occurrence of the change in the measured electrical signal and the activation transfer time, i.e., said difference equals to the activation transfer time of a valve. In another exemplary embodiment, the parameter is a fluid flow velocity and the relationship between the difference in the amplitude of the measured electrical signals of the first and the second sensors and the fluid flow velocity can be calculated based on known parameters of the fluid conduit.

According to some embodiments, step 206 further comprises learning, during a learning period, a relationship between values of the difference between the electrical signals of the first and the second sensing elements and values of the parameter associated with a flow of a fluid located within a fluid conduit, wherein the determining of said parameter is based on the relationship. According to some embodiments, the learning period occurs following the step of providing at least a first and a second sensing elements wherein the first sensing element contacts a first position on an exterior of the fluid conduit and the second sensing element contacts a second position on the exterior of the fluid conduit and before the measuring step.

According to further embodiments, said learning period comprises generating a sensing element response calibration curve, wherein said calibration curve represents a relationship between values of the difference between the electrical signals of the first and the second sensing elements and values of said parameter. For example, when said parameter is a flow rate of a fluid within a fluid conduit, the relationship between a flow rate and the value of the difference between the electrical signals can be measured by flowing a fluid within a specific fluid conduit at different flow rates, measuring the electrical signals of the sensing elements in response to said different flow rates and calculating the difference between the values of the electrical signals to generate a calibration curve. Said calibration curve can be generated before the actual measurement within said fluid conduit is performed and further be used to assess the flow rate in said particular fluid conduit for which the calibration curve has been generated. Accordingly, in some embodiments, the fluid conduit is a pre-calibrated fluid conduit comprising a first sensing element and a second sensing element attached to the exterior thereof. Such pre-calibrated fluid conduits are particularly useful in the single-use applications. The calibration curve can be generated while using a clamping device to diminish the cross-sectional diameter of the fluid conduit in the second position on the fluid conduit or between the first position and the second position. In additional embodiments, the method comprises providing a pre-calibrated clamping device, in which the sensing elements are connected to the inner surface thereof and are configured to contact the pre-calibrated fluid conduit at the first position and at the second position.

The response of each one of the sensing elements to a change in at least one of pressure or temperature as a function of time can further be calibrated. According to some embodiments, the sensing elements are calibrated following their attachment to the fluid conduit. According to further embodiments, the learning period occurs following the attachment of the sensing elements to the fluid conduit and an initial activation thereof. According to further embodiments, the sensing element response calibration curve is utilized in order to provide an accurate determination of the parameter associated with a flow of a fluid located within a fluid conduit based on the relationship between the values of the difference between the electrical signals and said parameter. For example, wherein the parameter is an activation transfer time, said relationship is a direct relationship between the difference in the time of occurrence of the change in the measured electrical signal and the activation transfer time, and the sensing element response calibration curve can be utilized in order to provide accurate timing of said occurrence, devoid of possible variations between the actual time of the event represented by the measured signals and the signal output time.

According to some embodiments, step 206 further comprises utilizing a control system in order to determine the parameter based on the difference between the electrical signals of the first and the second sensing elements. As used herein, the terms "sensing control circuitry" and "control system" are interchangeable and refers to a control system comprising electronic circuitry configured to detect or receive electrical signals from the sensing elements. In some embodiments, the control system comprises electronic circuitry configured to detect the electrical signals of the first and the second sensing elements. The electronic circuitry for measuring the electrical signal can comprise at least one of: a printed control board (PCB), provided with a central processing unit (CPU) or a processor, a memory, a real-time clock (RTC), a battery or other power source, and a communication module, wherein the CPU or the processor applies voltage to the sensing elements and calculates the resulting resistance.

According to further embodiments, the control system comprises a mutual time monitoring system. According to still further embodiments, the first and the second sensing elements are connected to the mutual time monitoring system via a wired or wireless communication means. According to some embodiments, the mutual time monitoring system is configured to receive the electrical signals of the first and the second sensing elements and record them as a function of time.

According to further embodiments, the control system is configured to determine or calculate the difference between the electrical signals of the first and the second sensing elements. In further embodiments, the control system is configured to receive information about a relationship between values of the difference between the electrical signals of the first and the second sensing elements and values of the parameter, and wherein the determining of said parameter is based on the relationship. In additional embodiments, the control system is configured to learn information about a relationship between values of the difference between the electrical signals of the first and the second sensing elements and values of the parameter associated with a flow of a fluid located within a fluid conduit According to some embodiments, the control system is further configured to calculate the theoretic to actual ratio (planned vs. actual) of material flowing through the fluid conduit. According to some embodiments, the control system is further configured to provide identifications or estimations of valve, pipe and/or vessel defects, including excessively long activation transfer times, thereby to recognize or predict actual or possible failures therein, based on determination of the differential parameter. According to further embodiments, the control system is further configured to alert a user in the condition of an actual or possible bursts or failures in the valve, pipe and/or vessel.

According to some embodiments, the control system and/or the mutual time monitoring system as presented herein are separate from a pre-existing primary control circuitry configured to control the operation of the fluid conduit and/or the fluid flowing therein, including for example, the operation of a valve. According to further embodiments, the control system and the mutual time monitoring system are independent of, or external to, the pre-existing primary control circuitry. According to still further embodiments, the pre-existing primary control circuitry comprises a programmable logic controller (PLC), and the mutual time monitoring system is external to the PLC.

Advantageously, according to some embodiments, the sensing elements of the present invention as presented herein can be attached to the external surface of a fluid conduit and provide electrical signals correlating with parameters associated with the flow of the fluid therein, wherein the operation of the sensing elements is not dependent on, or connected to, the pre-existing primary control circuitry (or PCL) controlling the flow within the fluid conduit or the operation thereof. Therefore, the utilization of the present sensing elements and the method of the present invention can provide critical operational data relating to various valves, pipes and/or vessels defects, without posing a potential security risk resulting from a possible unsecured connection to the pre-existing primary control circuitry (or PCL).

According to some embodiments, the mutual time monitoring system comprises a processor, selected from a microprocessor, a microcontroller, a Digital Signal Processor (DSP), an Application Specific Integrated Circuit (ASIC), a Field Programmable Gate Array (FPGA), a Programmable Logic Device (PLD), PLC, a controller, a state machine, gated logic, discrete hardware components, or any other suitable device or a combination of devices that can perform calculations or other manipulations of information. Each possibility represents a separate embodiment.

The term "processor", as used herein, refers to a single chip device which includes a plurality of modules which may be collected onto a single chip in order to perform various computer-related functions.

According to some embodiments, the first and the second sensing elements are configured to communicated with the processor utilizing wired or wireless communication (e.g., Wi-Fi or Bluetooth). According to further embodiments, the first and the second sensing elements, and the processor are configured to support or enable wireless communication. The processor can be directly attached to at least one of the first and the second sensing elements, or be embedded into a remote destinated device (e.g., a computer, a tablet, a smartphone, etc.).

Figure 1C:
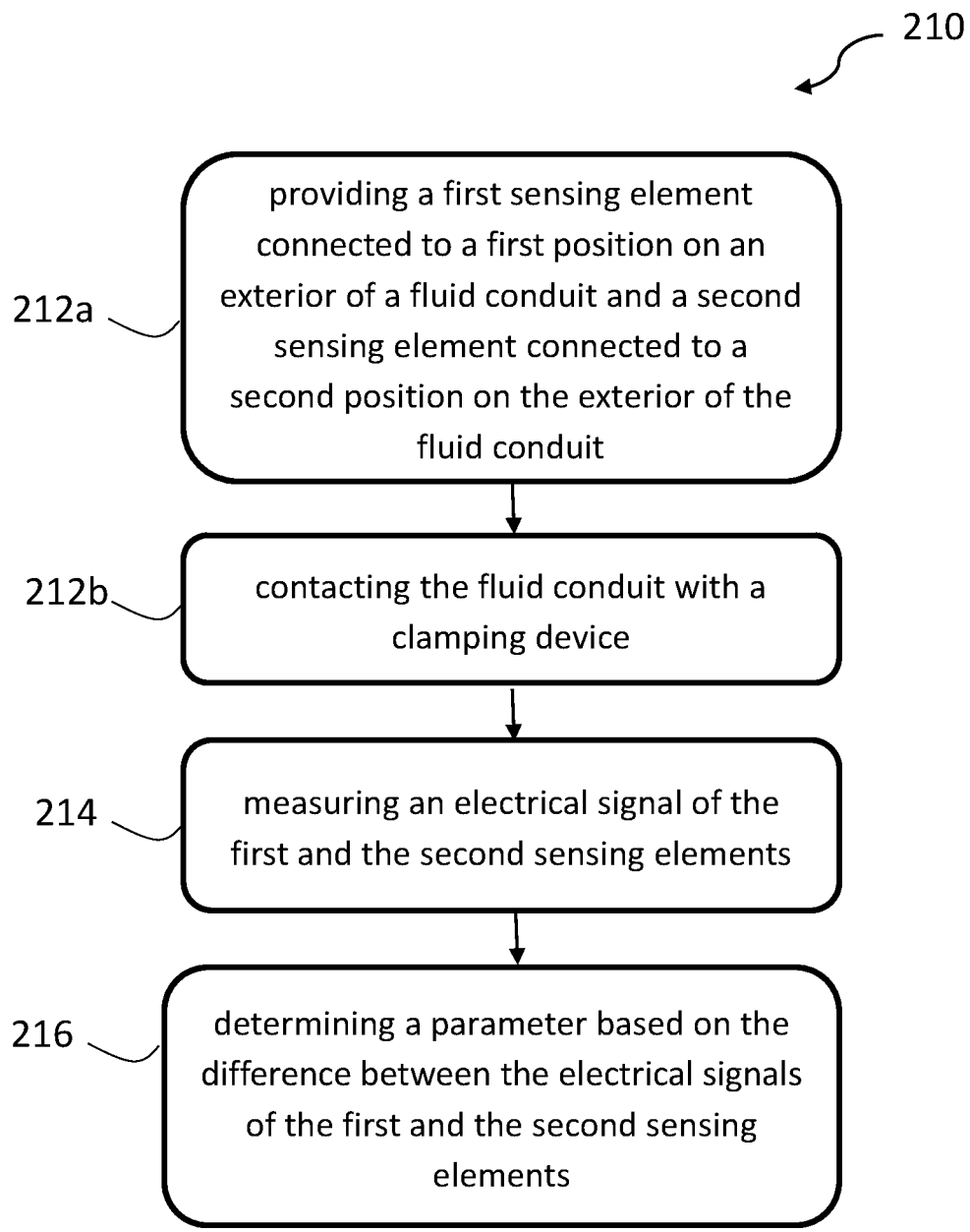
FIG. 1C is a flowchart of method 210 for determining flow rate of a fluid located within a fluid conduit based on the difference between electrical signals of at least two sensing elements, which are connected to the fluid conduit and using a clamping device, according to some embodiments of the present invention.

Reference is now made to FIG. 1C. showing a flowchart of method 210 for determining a flow rate of a fluid located within a fluid conduit, based on the difference between electrical signals of at least two sensing elements, and comprising the use of a clamping device, according to some embodiments of the present invention.

According to some embodiments, method 210 comprises step 212a, which comprises providing a plurality of sensing elements, wherein each sensing element comprises an assembly of nanoparticles disposed between conductive electrodes. According to further embodiments, each one of the plurality of sensing elements is in contact with a different position on the exterior of the fluid conduit. In some embodiments, the plurality of sensing elements comprises a first and a second sensing elements. In certain embodiments, the first sensing element contacts a first position on the exterior of the fluid conduit and the second sensing element contacts a second position on the exterior of the fluid conduit. The composition, structure and sensing mechanism of the sensing elements and their application to the fluid conduit are detailed hereinabove in connection with method 200 embodiments.

In some embodiments, method 210 comprises step 212b comprising contacting the fluid conduit with a clamping device. In some embodiments, said contacting comprises mounting the clamping device around the fluid conduit, wherein the first and the second positions are located within the clamping device. In certain embodiments, step 212b is performed after step 212a, i.e., once the sensing elements are printed on or attached to the fluid conduit, the clamping device is mounted thereupon.

According to some embodiments, the clamping device is configured to diminish the cross-sectional diameter of the fluid conduit at the first position, at the second position, or between the first position and the second position, thereby forming a throat section. The clamping device can be further configured to exert pressure on at least one of the first position and the second position. According to further embodiments, the clamping device is configured to generate a Venturi effect within the fluid conduit. According to still further embodiments, the fluid conduit comprises at least one flexible material, and is configured to undergo shape deformation resulting from the application of an external pressure force generated by the clamping device attached thereto. The structure and properties of the clamping device suitable for use in method 300 and its mounting on the fluid conduit with respect to the sensing elements position are further detailed in FIGS. 2D, and 3A-3F hereinbelow.

According to some embodiments, method 210 further comprises step 214 comprising measuring an electrical signal of the first and the second sensing elements. According to some embodiments, the measurement of the electrical signals of the first and the second sensing elements is performed simultaneously. The measurement can be performed as detailed hereinabove in connection with method 200 embodiments.

According to some embodiments, step 214 further comprises exerting a pressure on the fluid conduit during the measurement of the electrical signal. According to some embodiments, the pressure is exerted by the clamping device.

According to some embodiments, method 210 further comprises step 216 of determining, based on the difference between the electrical signals of the first and the second sensing elements, the parameter associated with a flow of a fluid located within the fluid conduit. Step 216 can be performed as detailed hereinabove in connection with method 200 embodiments.

Figure 1D:
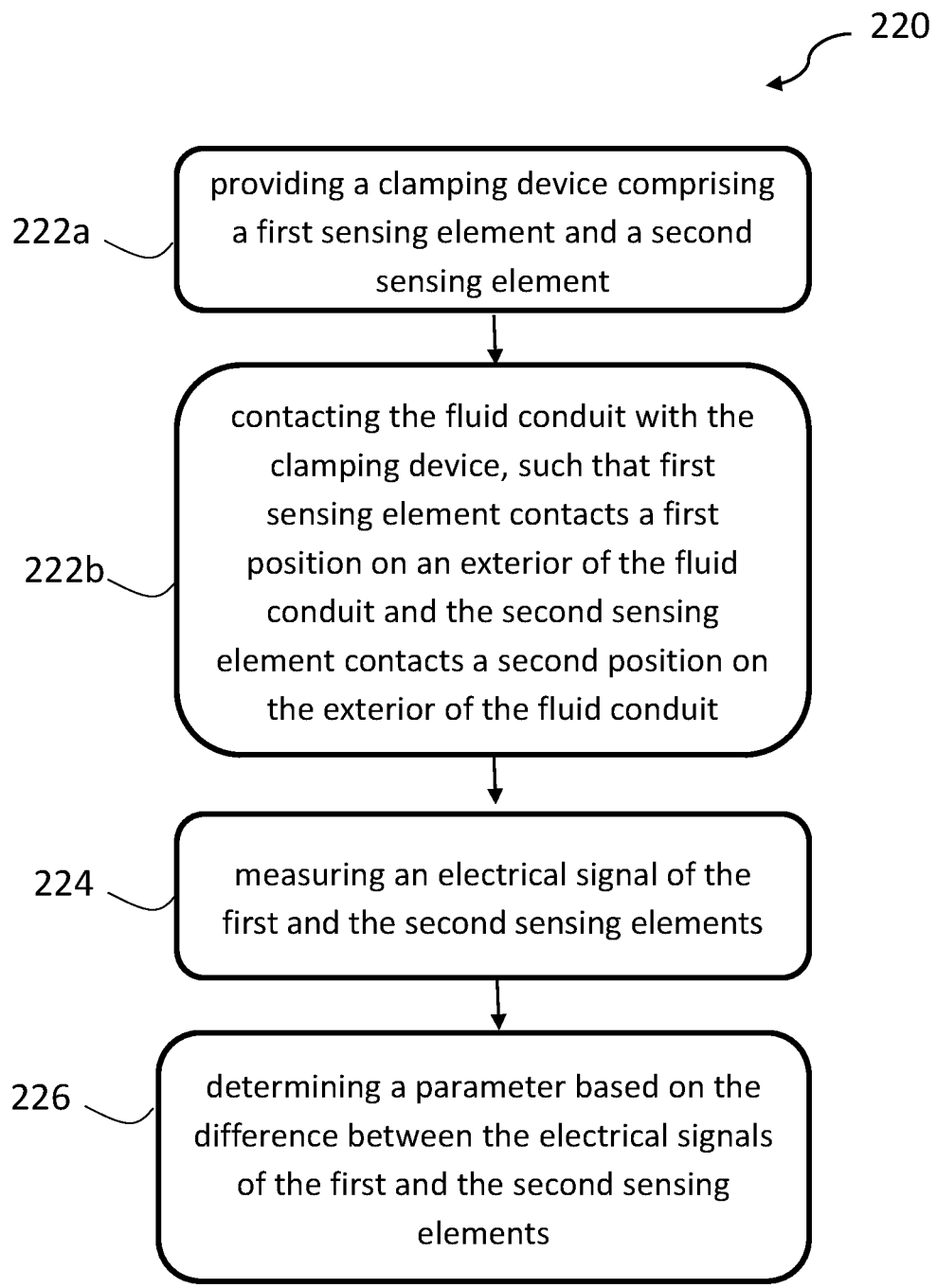
FIG. 1D is a flowchart of method 220 for determining flow rate of a fluid located within a fluid conduit based on the difference between electrical signals of at least two sensing elements and using a clamping device, wherein the sensing elements are connected to the clamping device, according to some embodiments of the present invention.

Reference is now made to FIG. 1D. showing a flowchart of method 220 for determining a flow rate of a fluid located within a fluid conduit, based on the difference between electrical signals of at least two sensing elements, and comprising the use of a clamping device, according to some embodiments of the present invention.

According to some embodiments, method 220 comprises step 222a, which comprises providing a clamping device comprising a plurality of sensing elements, wherein each sensing element comprises an assembly of nanoparticles disposed between conductive electrodes. The sensing elements are disposed on the inner surface of the clamping device.

According to further embodiments, method 220 further comprises step 222b comprising contacting the fluid conduit with the clamping device, such that each one of the plurality of sensing elements is in contact with a different position on the exterior of the fluid conduit. In some embodiments, said contacting comprises mounting the clamping device around the fluid conduit. In some embodiments, the plurality of sensing elements comprises a first and a second sensing elements. In certain embodiments, the first sensing element contacts a first position on the exterior of the fluid conduit and the second sensing element contacts a second position on the exterior of the fluid conduit. The composition, structure and sensing mechanism of the sensing elements and their application to the fluid conduit are detailed hereinabove in connection with method 200 embodiments.

According to some embodiments, the clamping device is configured to diminish the cross-sectional diameter of the fluid conduit at the first position, at the second position, or between the first position and the second position, thereby forming a throat section. The clamping device can be further configured to exert pressure on at least one of the first position and the second position. According to further embodiments, the clamping device is configured to generate a Venturi effect within the fluid conduit. According to still further embodiments, the fluid conduit comprises at least one flexible material, and is configured to undergo shape deformation resulting from the application of an external pressure force generated by the designated clamping device attached thereto. The structure and properties of the clamping device suitable for use in method 220 and the position of the sensing elements on the inner surface of the clamping device are further detailed in FIGS. 2D, and 3A-3F hereinbelow.

According to some embodiments, method 220 further comprises step 226 of determining, based on the difference between the electrical signals of the first and the second sensing elements, the parameter associated with a flow of a fluid located within the fluid conduit. Step 226 can be performed as detailed hereinabove in connection with method 200 embodiments. According to various embodiments, there is provided a sensing device comprising a processor, a first and a second sensing elements, comprising an assembly of nanoparticles and conductive electrodes, wherein the conductive electrodes are coupled between the processor and the assembly of nanoparticles, wherein the first sensing device is configured to contact a first position on an exterior of a fluid conduit and the second sensing element is configured to contact a second position on the exterior of the fluid conduit; and wherein the sensing device is configured to (a) measure an electrical signal of the first and the second sensing elements, wherein the electrical signal is responsive to at least one of pressure and temperature; and (b) determine said parameter by analyzing the difference between the electrical signals of the first and the second sensing elements with the processor. According to further embodiments, said parameter is selected from the group consisting of an activation transfer time of a valve, a flow rate of the fluid, a pressure wave velocity, and combinations thereof.

Figure 2A:
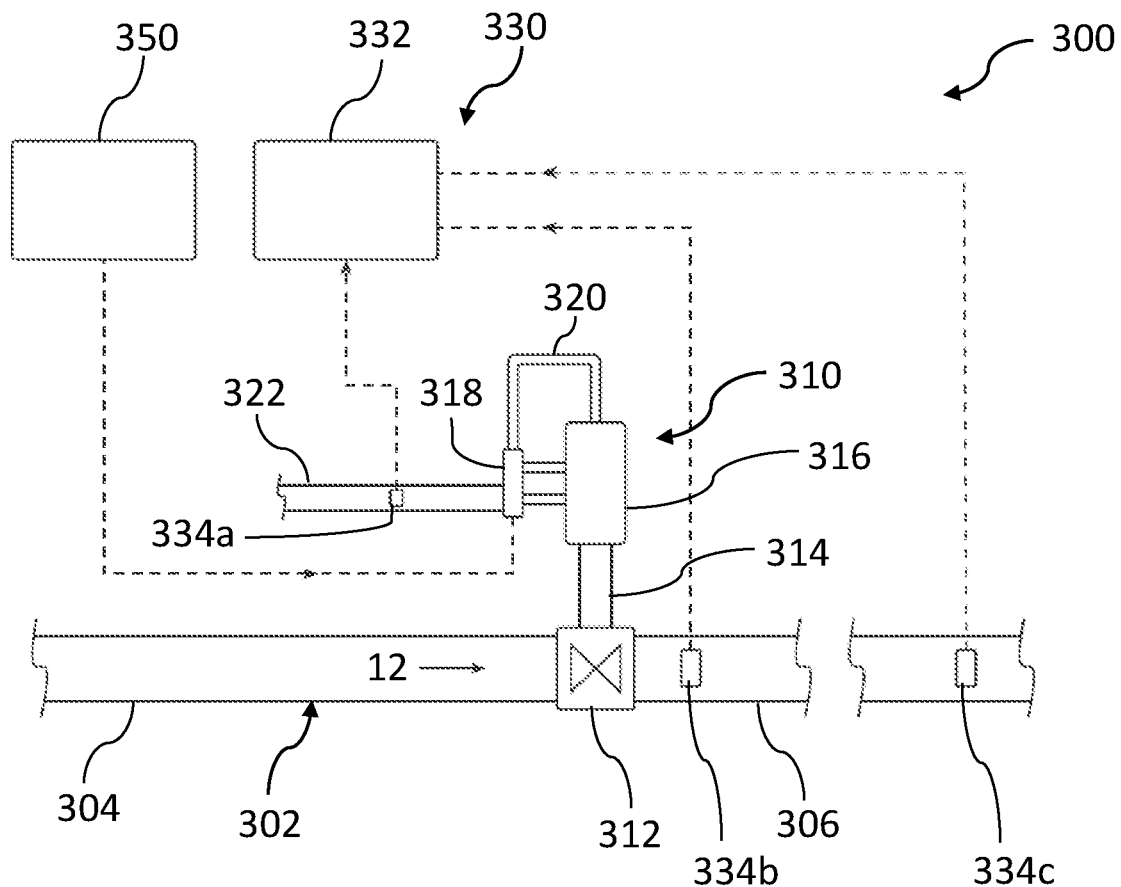
FIG. 2A illustrates a flow system 300, according to some embodiments.

Reference is now made to FIG. 2A, illustrating a flow system 300 according to some embodiments. Flow system 300 comprises a fluid conduit 302, and is configured to allow fluid flow through the fluid conduit 302 in the direction of arrow 12. The fluid conduit can be, according to some embodiments, a pipe, a tube, a hose, a catheter, a shaft and the like, defining an inner lumen through which fluids, such as gas or liquid, may flow. According to some embodiments, the fluid conduit is expandable in the radial direction, and may expand or contract to a certain degree as a result of the fluid pressure therein.

According to some embodiments, the flow system 300 further comprises a pneumatic or hydraulic valve assembly 310, which includes a control valve 312 disposed within the fluid conduit 302. The fluid conduit may include an inflow section 304 and an outflow section 306, wherein the control valve 312 is disposed therebetween, and is configured to regulate flow from the inflow section 304 to the outflow section 306.

The pneumatic/hydraulic valve assembly 310 may further comprise a piston 314 movable through a cylinder 316, in a direction that can be substantially perpendicular relative to the flow direction 12 within the fluid conduit 302. The control valve 310 can be in the form of a seal-member or plunger configured to seal against a corresponding seat (not shown). The control valve 310 is attached to the piston 314 and movable therewith, between an open state, allowing fluid flow through the fluid conduit 302, and a sealed state, preventing fluid from flowing from the inflow section 304 to the outflow section 306.

The term "pneumatic/hydraulic", as used herein for any component or assembly, means that the component or assembly can be implemented either as a pneumatic or as a hydraulic component or system.

According to some embodiments, the flow system 300 further comprises a pneumatic/hydraulic line 322, configured to deliver air in the case of a pneumatic valve assembly 310, or hydraulic fluid (e.g., oil) in the case of a hydraulic valve assembly 310, toward the cylinder 316. According to some embodiments, the pneumatic/hydraulic valve assembly 310 further comprises a pneumatic/hydraulic controller 318 disposed between the pneumatic/hydraulic line 322 and the cylinder 316, configured to control the flow of air or hydraulic fluid into the cylinder, thereby influencing the position of the piston 314 and the state of the control valve 312.

According to some embodiments, the pneumatic/hydraulic valve assembly 310 further comprises a pneumatic/hydraulic outflow 320, which can be in the form of a tube for conducting air or hydraulic fluid out of the cylinder 316, for example toward the pneumatic/hydraulic controller 318. According to some embodiment, the system 300 further comprises a primary control circuitry 350, configured to control the operation of the pneumatic/hydraulic valve assembly 310 by provided appropriate control signals to the pneumatic/hydraulic controller 318. The primary control circuitry 350 can include a printed control board (PCB), provided with a central processing unit (CPU), a memory, a real-time clock (RTC), and potentially a communication module (all of which are not shown).

According to some embodiments, the flow system 300 further comprises a sensing assembly 330 provided with at least two sensing elements 334. The sensing assembly 330 further comprises a sensing control circuitry 332, configured to receive signals from the at least two sensing elements 334. According to some embodiments, the sensing control circuitry 332 can include a printed control board (PCB), provided with a central processing unit (CPU), a memory, a real-time clock (RTC), and potentially a communication module (all of which are not shown). The CPU of the sensing control circuitry 332 may be configured for processing and interpreting sensed signals received from the at least two sensing elements 334. The CPU of the sensing control circuitry 332 may further be configured for receiving and/or learning information about a relationship between values of the difference between the electrical signals of sensing elements 334 and values of a parameter associated with a flow of a fluid within flow system 300. According to some embodiments, the CPU may include software for interpreting sensed signals. The RTC may be utilized to provide the timing of each sensed signal. Since all sensing elements 334 are electrically coupled to the same sensing control circuitry 332 with a single RTC, the same RTC is utilized for providing timing of sensed signals from all sensing elements 334, enabling the CPU to compare between the times at which signals from different sensing elements 334 were retrieved.

The term "CPU", as used herein, refers to a computing component that interprets and executes instructions.

The term "memory", as used herein, refers to any suitable data storage component, including volatile memory types such as random access memory, DRAM, SDRAM, and others.

The term "RTC", as used herein, refers to any suitable clock module configured to record time, typically in the form of an integrated circuit.

According to some embodiments, the sensing control circuitry 332 further comprises a communication module (not shown), which comprises a wireless communication component such as a transmitter, a receiver, and/or a transceiver, configured to wirelessly transmit signals to, and/or receive signals from, a remote-control device, such as a remote server, a remote computer, a remote smartphone, the primary control circuitry 350, and the like. The communication module can be a wireless communication unit, configured to transmit and/or receive signals to and/or from a remote device, using one or more communication protocols such as Bluetooth, RF, LORA, Zigbee, Z-Wave, Near Field Communication (NFC), and the like.

According to some embodiments, the at least two sensing elements 334 comprise a valve feed-line sensing element 334a, as shown in FIG. 2A, disposed over the pneumatic/hydraulic line 322 at a region adjacent the pneumatic/hydraulic assembly 310 (the first position), such as in the vicinity of the pneumatic/hydraulic controller 318, and a first outflow sensing element 334b, disposed over a portion of the outflow section 306 in the vicinity of the control valve 312 (the second position).

According to some embodiments, each of the fluid conduit 302 and the pneumatic/hydraulic line 322 comprises a compliant tube, made of a suitable material such as silicon, polyurethane, PVC and the like. The fluid conduit 302 and the pneumatic/hydraulic line 322 may be provided with different dimensions, and may be made of different materials. Each of the fluid conduit 302 and the pneumatic/hydraulic line 322 may expand as a result of the inner pressure applied thereto by the fluid flowing therethrough. Thus, when air or hydraulic fluid flow through the pneumatic/hydraulic line 322, for example—into the cylinder 316 in response to a signal provided to the pneumatic/hydraulic controller 318 by the primary control circuitry 350, the pneumatic/hydraulic line 322 expands and the feed-line sensing element 334a is configured to generate a signal commensurate with the inner pressure within the pneumatic/hydraulic line 322. Similarly, when fluid flows through the outflow section 306, for example—as a result of the control valve 312 switching to the open state, it expands and the first outflow sensing element 334b is configured to generate a signal commensurate with the inner pressure within the outflow section 306.

According to some embodiments, the CPU of the sensing control circuitry 332 is configured to derive a parameter indicative of an activation transfer time of the pneumatic/hydraulic valve assembly 310, e.g., the time difference between the rise in pressure sensed by the feed-line sensing element 334a, occurring upon activation of the pneumatic/hydraulic valve assembly 310 by the primary control circuitry 350, and the moment pressure sensed by the first outflow sensing element 334b rises, indicative of fluid flow through the fluid conduit 302 once the control valve 312 is moved to the open state. According to some embodiments, method 200 as presented herein is configured to determine, based on the time related difference between the occurrence of a change in the measured electrical signals of the feed-line sensing element 334a and the first outflow sensing element 334b, the activation transfer time of the pneumatic/hydraulic valve assembly 310. This parameter may be important to measure the delay that may occur between the activation of the pneumatic/hydraulic valve assembly 310 and actual flow through the fluid conduit 302, which may be influenced by a variety of parameters, such as the structural configuration of the pneumatic/hydraulic valve assembly 310. For example, the length of the pneumatic/hydraulic line 322 may influence the activation transfer time, as is further elaborated hereinbelow. Furthermore, change in the activation transfer time for the same flow system 300 over time, may be indicative of deterioration of the pneumatic/hydraulic valve assembly 310 or any component thereof.

According to some embodiments, the signals generated by the first outflow sensing element 334b are further utilized to derive a parameter indicative of valve opening time, measured from the time the first outflow sensing element 334b measures peak maximal pressure, and the pressure drop back to the minimal pressure, indicative of no-flow due to the control valve 312 returning to the closed state. It is to be understood that the valve opening time is the steady state flow parameter described herein above.

According to some embodiments, the valve opening time and the activation transfer time are summed together, to derive a parameter indicative of the entire duration from the moment of activating the pneumatic/hydraulic valve assembly 310 and the return of the control valve 312 to the closed state.

According to some embodiments, the slope of the pressure rising within the outflow section 306 as measured by a sensing element 334 attached thereto, may be indicative of the material properties of the specific section of the fluid conduit 302 to which the sensing element 334 is attached. Specifically, a faster rise in pressure measured along a specific region of the fluid conduit 302 may be indicative of this specific region being more compliant and expanding faster, for example due to fatigue or other factors that may result in material deterioration over time.

According to some embodiments, more than one sensing element 334 is attached to the fluid conduit 302. According to some embodiments, more than one sensing element 334 is attached to the outflow section. FIG. 2A shows an exemplary configuration of at least two sensing elements 334 attached to the outflow section 306, including the first outflow sensing element 334b positioned in the vicinity of the control valve 312, and a second outflow sensing element 334c positioned further downstream (the third position).

According to some embodiments, the distance between the first outflow sensing element 334b and the second outflow sensing element 334c is at least 1 cm. According to some embodiments, the distance between the first outflow sensing element 334b and the second outflow sensing element 334c is at least 0.5 meter. According to some embodiments, the distance between the first outflow sensing element 334b and the second outflow sensing element 334c is at least 1 meter. According to some embodiments, the distance between the first outflow sensing element 334b and the second outflow sensing element 334c is at least 3 meters. According to some embodiments, the distance between the first outflow sensing element 334b and the second outflow sensing element 334c is at least 5 meters. According to some embodiments, the distance between the first outflow sensing element 334b and the second outflow sensing element 334c is a function of the cross-sectional diameter of fluid conduit 302 and/or the pressures of the fluid residing therein. According to further embodiments, the distance between the first outflow sensing element 334b and the second outflow sensing element 334c is at least about 0.1 times the cross-sectional diameter of fluid conduit 302. It is to be understood, that at least one of the feed-line sensing element 334a, the first outflow sensing element 334b, and the second outflow sensing element 334c are identical to the sensing elements as provided herein above.

The rate of pressure rising, sensed by each of the first outflow sensing element 334b and the second outflow sensing element 334c, may be indicative of the material properties of the corresponding portion of the outflow section 306. While two sensing elements, 334b and 334c, are shown in the exemplary embodiment illustrated in FIG. 2A, it will be understood that more than two sensing elements 334 may be attached to the outflow section 306, and that one or more sensing elements 334 can be attached to the inflow section 304 as well, to monitor potential deterioration of material properties along different regions of the fluid conduit 302.

According to some embodiments, at least two sensing elements 334 attached to the outflow section 306, such as the first outflow sensing element 334b and the second outflow sensing element 334c shown in FIG. 2A, are utilized to measure pressure wave velocity (PWV), which is the speed at which the pressure wave propagates through the outflow section 306. PWV may be indicative of the elasticity and stiffness of the fluid conduit 302. For example, PWV may be measured as a monitoring index for potential deterioration of the flow system 300, as higher compliance of the fluid conduit 302 over time will result in lower PWV. Similarly, PWV may be indicative of fluid properties. For example, fluids with higher viscosity will propagate over a longer time period along the fluid conduit 302.

According to some embodiments, pressure signals are generated by both the first outflow sensing element 334b and the second outflow sensing element 334c and sent to the sensing control circuitry 332. Based on the time delay between the signals received from both sensing elements 334b and 334c, with reference to the same phase of the same pressure wave, and the known distance between the sensing elements 334b and 334c, the PWV can be derived.

Advantageously, a sensing assembly 330 can be coupled to a pre-existing conventional flow system, without requiring any structural modification thereto and without requiring any downtime period during the operation thereof for attaching components of the sensing assembly 330 to the flow system. Specifically, various sensing elements 334 can be attached to various fluid conduits of the flow system, such as section of a fluid conduit 302 and/or the pneumatic/hydraulic line 322. Moreover, since the sensing elements 334 are coupled to a sensing control circuitry 332, which is distinct from the primary control circuitry 350, no modification are required for any electric components controlled by the pre-existing primary control circuitry 350 as well. In some cases, wireless communication between the sensing control circuitry 332 and the primary control circuitry 350, can enable the primary control circuitry 350 to adjust various functionalities of the flow system 300, according to readings from the sensing elements 334 and the parameters that can be derived therefrom.

According to some embodiments, method 200 as presented hereinabove is configured to determine, based on the time related difference between the occurrence of a change in the measured electrical signals of the sensing elements 334, the activation transfer time of valve 312 and PWV within fluid conduit 302.

Figure 2B:
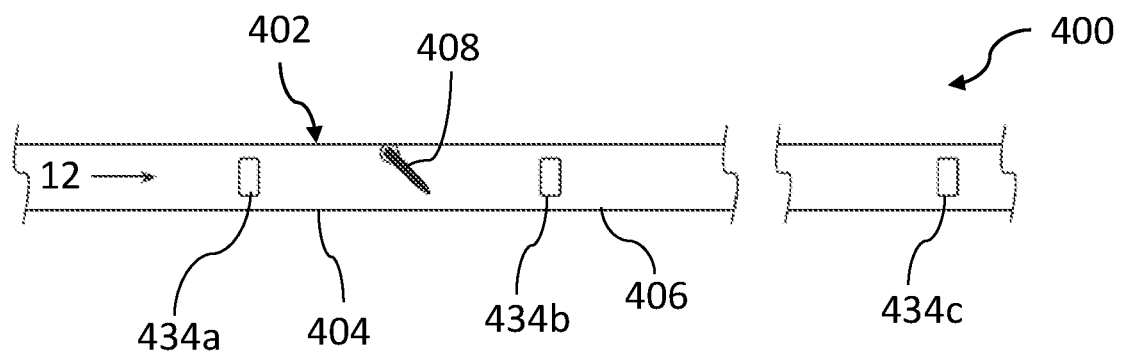
FIG. 2B illustrates a portion of a flow system 400, according to some embodiments.

Reference is now made to FIG. 2B, illustrating a portion of a flow system 400 according to some embodiments. Flow system 400 comprises a fluid conduit 402, which can be similar in structure and function to the fluid conduit 302, wherein the main difference resides in that the flow system 400 includes a valve 408, disposed between an inflow section 402 and an outflow section 404 of the fluid conduit 402, which may be similar or different from the pneumatic or hydraulic valve assembly 310.

According to some embodiments, valve 408 is selected from a pneumatic or hydraulic actuator valve, a ball valve, a butterfly valve, a choke valve, a diaphragm valve (membrane valve), a gate valve, a globe valve, a knife valve, a needle valve, a pinch valve, a piston valve, a plug valve, a spool valve, a solenoid valve, or any other valve known in the art. Each possibility represents a separate embodiment. The valve 408 can be, in some embodiments, movable between a closed state and an open state due to a pressure difference between both sides thereof. Alternatively or additionally, the valve 408 can be switched to the closed or open states by a primary control circuitry (not shown in FIG. 2B).

According to some embodiments, at least two sensing elements 434 are attached to the fluid conduit 402 on both sides of the valve 408. The sensing elements 434 are similar in structure and function to the sensing elements 334, and may be coupled to a sensing control circuitry (not shown in FIG. 2B) which is similar to the sensing control circuitry 332. According to some embodiments, an inflow sensing element 434a is attached to the exterior surface of the inflow section 402 (the first position), potentially in the vicinity of the valve 408, and a first outflow sensing element 434b is attached to the exterior surface the outflow section 406 (the second position), potentially in the vicinity of the valve 408.

According to some embodiments, a parameter derived from the measurement signals from the inflow sensor 434a and the first outflow sensor 434b may be indicative of various characteristics relating to the function of the flow system 400, such as the response time of the valve 408.

According to some embodiments, the flow system 400 further comprises a second outflow sensing element 434c, positioned further downstream from the first outflow sensing element 434b (the third position), wherein the arrangement of both first and second sensing elements 434b and 434c, respectively, can follow any of the embodiments described for first and second sensing elements 334b and 334c, and utilized in a similar manner to derive PWV. Moreover, in some embodiments, PWV can be derived in a similar manner between the inflow sensing element 434a and any of the first and second sensing elements 434b and 434c, in an open state of the valve 408, assuming that an appropriate distance between the sensing elements 343 is sufficient for deriving this parameter.

It is to be understood, that the inflow sensor 434a can be identical to the first sensing element, the first outflow sensing element 434b can be identical to the second sensing element, and that the second outflow sensing element 434c can be identical to the third sensing element, as presented hereinabove.

According to some embodiments, any of the sensing elements 434 can be utilized to derive the opening time of the valve 408, as well as the slope of the pressure rising in the specific region of the fluid conduit 402 to which they are attached, in a similar manner and for a similar purpose as described for sensing elements 334.

Figure 2C:
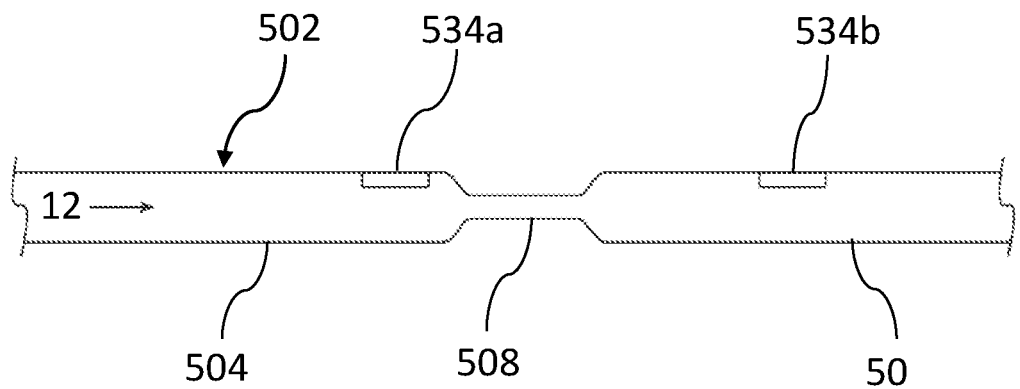
FIG. 2C illustrates a fluid conduit 502 including a constriction or throat 508, and at least two sensing elements 534 attached to the fluid conduit 502, in various arrangements according to some embodiments.
Figure 2D:
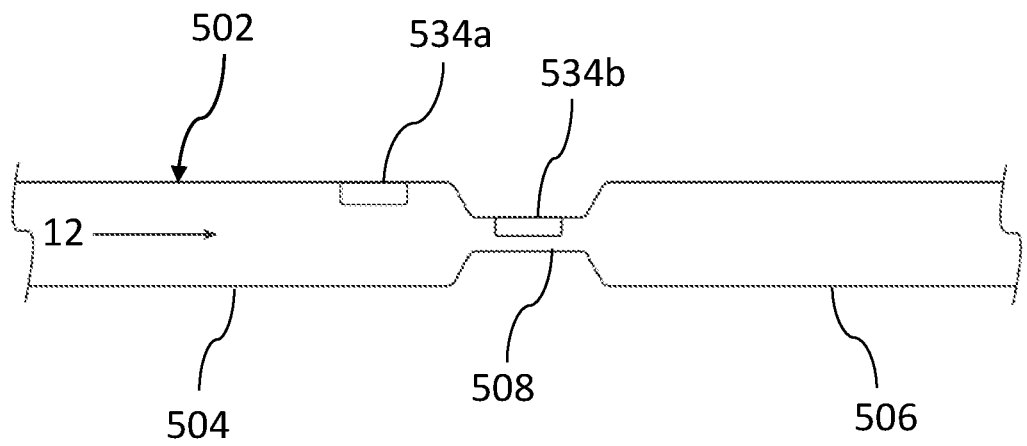
FIG. 2D illustrates a fluid conduit 502 including a constriction or throat 508, and at least two sensing elements 534 attached to the fluid conduit 502, in various arrangements according to some embodiments.

According to some embodiments, a fluid conduit can be provided with a constriction or throat, and at least two sensing elements are attached to the fluid conduit in order to derive flow measurement therethrough. Reference is now made to FIGS. 2C-2D, illustrating a fluid conduit 502 including a constriction or throat 508, and at least two sensing elements 534 attached to the fluid conduit 502, in various arrangements according to some embodiments. The fluid conduit 502 is configured to allow fluid flow therethrough in the direction of arrow 12. The fluid conduit can be, according to some embodiments, a pipe, a hose, a catheter, a shaft and the like, defining an inner lumen through which fluids, such as gas or liquid, may flow. According to some embodiments, the fluid conduit is expandable in the radial direction, and may expand or contract to a certain degree as a result of the fluid pressure therein. According to some embodiments, the fluid conduit 502 comprises a compliant tube, made of a suitable material such as silicon, polyurethane, PVC and the like.

The fluid conduit 502 comprises an inflow section 504, an outflow section 506, and a throat section 508 disposed between the inflow section 504 and the outflow sections 506. The throat section 508 is provided with a cross-sectional area which is smaller than the cross-sectional area of either the inflow section 504 and the outflow section 506. According to some embodiments, the cross-sectional area of the inflow section 504 is identical to that of the outflow section 506.

According to some embodiments, the fluid conduit 502 includes tapering transition regions (not numbered) between the inflow section 504 and the throat 508, and between the throat section 508 and the outflow section 506, wherein the tapering angles of the transition regions on both sides of the throat section 508 are not necessarily identical.

According to some embodiments, at least two sensing elements 534 are attached to the outer surface of different sections of the fluid conduit 502. The sensing elements 534 are similar in structure and function to the sensing elements 334, and may be coupled to a sensing control circuitry (not shown in FIGS. 2C-2D) which is similar to the sensing control circuitry 332.

FIG. 2C shows one arrangement of the sensing elements 534, wherein a first sensing element 534a is attached to the outer surface of the inflow section 504 (the first position), optionally in the vicinity of the throat 508, and a second sensing element 534b is attached to the outer surface of the outlet section 506 (the second position). Preferably, the second sensing element 534b is sufficiently distanced downstream and away from the throat 508, to avoid measurement disturbances that may arise from turbulence or vortices formed at the transition of the fluid flowing from the constricted area of the throat section 508 to the wider area of the outlet section 506.

The pressure readings from both sides of the throat or constriction 508 can be utilized, based on the principle of Bernoulli's Equation, to derive the flow rate through the fluid conduit 502. Bernoulli's theorem uses the assumption of an inviscid flow, and in most instances, a correction factor, such as a discharge coefficient, is used to correct practical measurements to overcome deviations from this assumption.

While a Venturi configuration is illustrated in FIG. 2C, it will be understood that other constrictions can be utilized instead of the throat section 508 in a similar manner, including, but not limited to: a valve, a flange, a sealing, an orifice plate, a filter, and/or a nozzle, each of which is configured to restrict the flow to a smaller cross-sectional area than that of either the inflow section 504 or the outflow section 506.

FIG. 2D shows another arrangement of the sensing elements 534, wherein a first sensing element 534a is attached to the outer surface of the inflow section 504 (the first position), optionally in the vicinity of the throat 508, and a second sensing element 534b is attached to the outer surface of the throat section 508 (the second position). Pressure readings from both sensing elements 534a and 534b in this arrangement may be utilized in a conventional manner known in the art for utilizing a Venturi tube to derive the flow rate through the fluid channel 504.

According to some embodiments, method 200 as presented herein is configured to determine, based on the difference in the amplitude of the measured electrical signals of the first sensing element 534a and the second sensing element 534b, the flow rate and/or velocity through fluid conduit 502 based on Venturi effect calculations.

According to some embodiments, the present invention provides a sensing assembly comprising a CPU as presented herein, a first and a second sensing elements, comprising an assembly of nanoparticles and conductive electrodes, wherein the conductive electrodes are coupled between the processor and the assembly of nanoparticles as was presented herein, wherein the first sensing element is configured to be connected to a first position on an exterior of a fluid conduit and the second sensing element is configured to be connected to a second position on the exterior of the fluid conduit; and wherein the sensing assembly is configured to (a) measure an electrical signal of the first and the second sensing elements; wherein the electrical signal is responsive to at least one of pressure and temperature; and (b) determine said parameter by analyzing the difference between the electrical signals of the first and the second sensing elements with the CPU.

According to some embodiments, the parameter is selected from the group consisting of an activation transfer time of a valve, a steady state downstream flow duration following activation of a valve, a flow rate of the fluid, a pressure wave velocity, and combinations thereof.

In some embodiments, the fluid conduit is provided as a tube having a uniform cross-sectional area along its length, and an external clamping device is used to constrict a central region thereof, resulting in a sectional configuration similar to that shown for fluid conduit 502 in FIGS. 2C-2D.

Figure 3A:
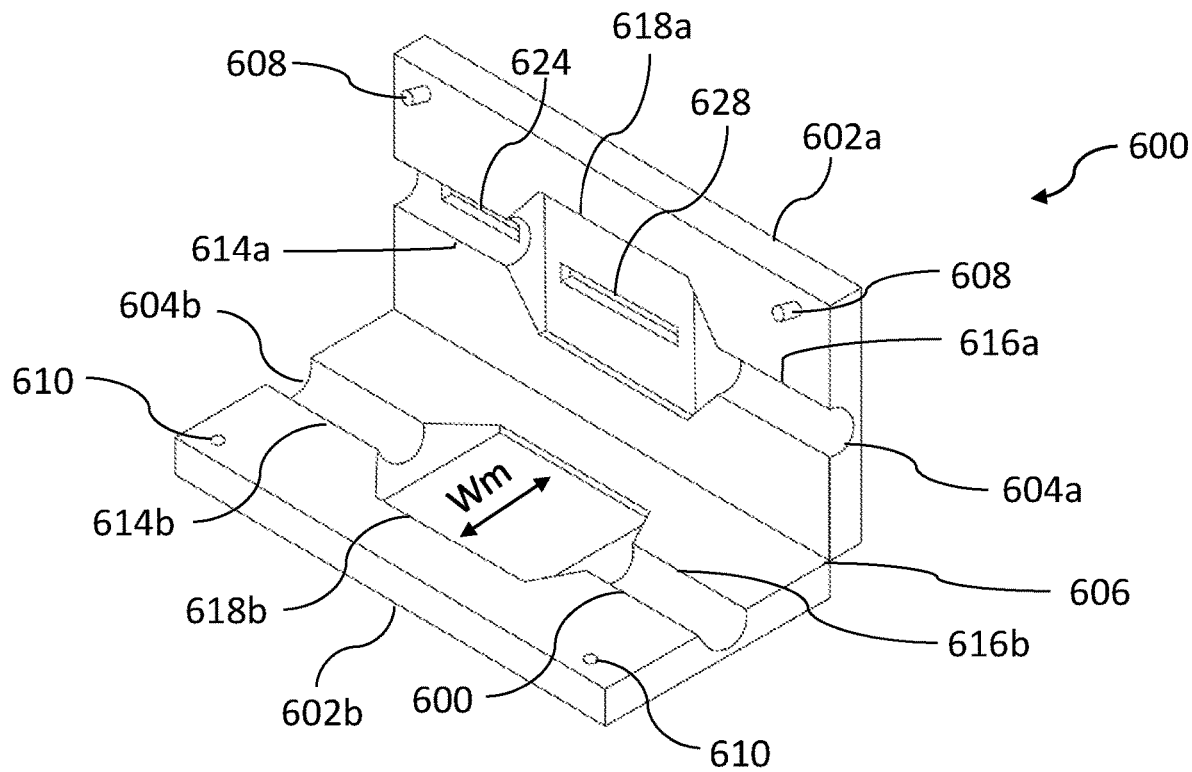
FIG. 3A shows a view in perspective of a clamping device 600 in an open state thereof, according to some embodiments.
Figure 3B:
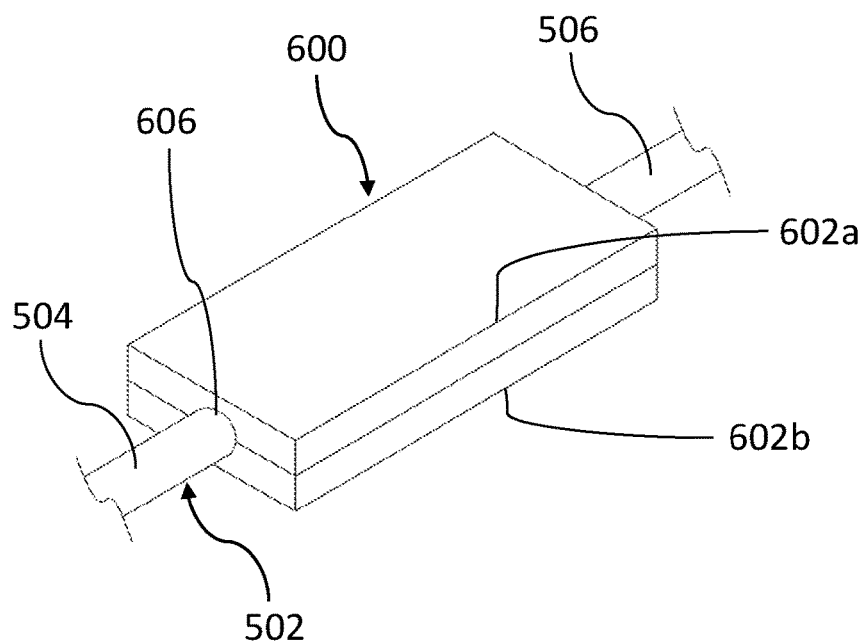
FIG. 3B shows a view in perspective of a clamping device 600 clamped over a fluid conduit 502, according to some embodiments.
Figure 3C:
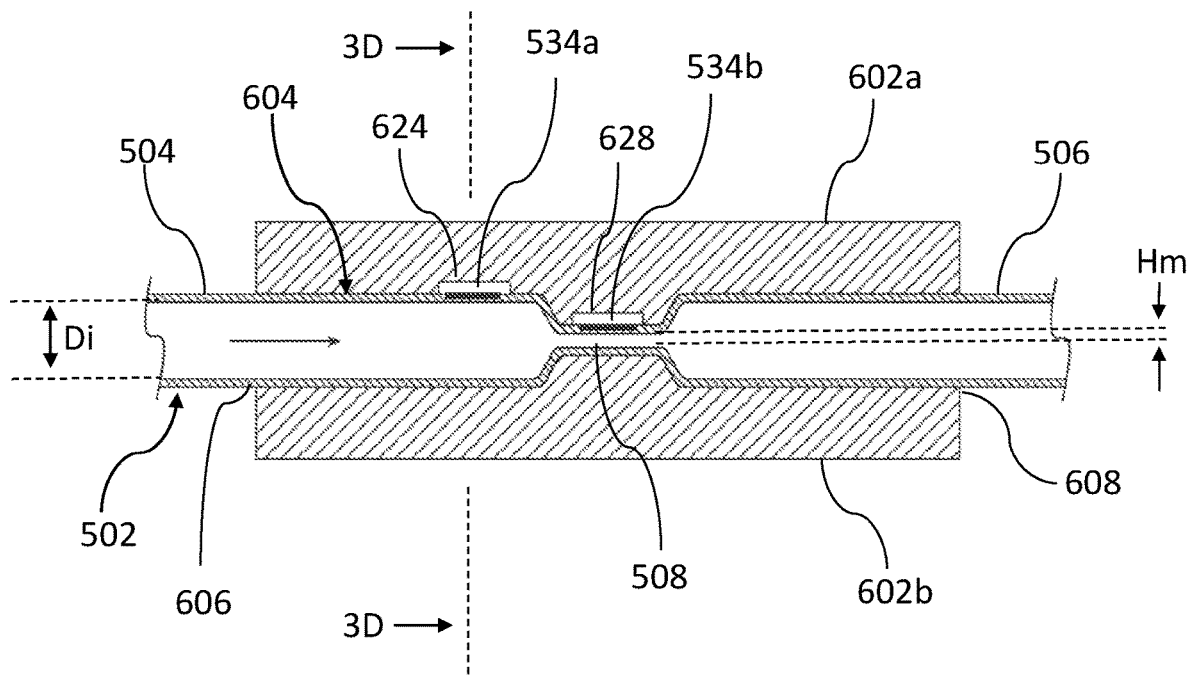
FIG. 3C shows a longitudinal cross-sectional view of the clamping device 600 clamped over the fluid conduit 502 of FIG. 3B, according to some embodiments.

Reference is now made to FIGS. 3A-3F. FIG. 3A shows a view in perspective of a clamping device 600 in an open state thereof, according to some embodiments. FIG. 3B shows a view in perspective of a clamping device 600 clamped over a fluid conduit 502, according to some embodiments. FIG. 3C shows a longitudinal cross-sectional view of the clamping device 600 clamped over the fluid conduit 502 of FIG. 3B. The clamping device 600 comprises two clamping portions 602, namely a first clamping portion 602a and a second clamping portion 602b, which are detachably attachable to each other and configured to clamp against each other in a closed state of the clamping device 600, shown for example in FIGS. 3B and 3C. Each clamping portion 602a, 602b comprises a channel 604a, 604b defined along the length of its inner surface, together defining an enclosed channel 604 in the closed state of the clamping device 600. The channel 604, extending between an inlet opening 606 and an outlet opening 608, is configured to accommodate a fluid conduit therein, and to deform a portion thereof to a configuration having a narrowed throat portion, such as that of the fluid conduit 502 shown in FIGS. 2C-2D.

The channel 604 comprises an inlet channel section 614, an outlet channel section 616, and a central channel section 618 between the inlet channel section 614 and the outlet channel section 616.

According to some embodiments, the cross-sectional geometry of the inlet channel section 614 and/or the outlet channel section 616 is circular. It is to be understood, however, that the cross-sectional geometry of the inlet channel section 614 and/or the outlet channel section 616 may be of a different shape, such as a square, triangular or any other curvilinear or rectilinear cross-section.

As shown in FIG. 3C, the diameter Di denotes the diameter of the inlet channel section 614, which may be also identical to the diameter of the outlet channel section 616. As further shown in FIG. 3C, the distance Hm denotes the vertical height of the central channel section 618, defined between the first central channel section 618a and the second central channel section 618b. As shown in FIG. 3A, Wm denotes the lateral width of the central channel section 618.

According to some embodiments, the vertical height Hm of the central channel section 618 is smaller than the diameter Di of the inlet channel section 614 and/or outlet channel section 616. Specifically, each of the first and second channels 604a and 604b, comprises a transition tapering portion (not numbered) sloping radially inward in a vertical direction (i.e., toward the opposite clamping portion 602), approximating the surfaces of the first central channel section 618a and the second central channel section 618b toward each other. Thus, when the clamping device 600 is clamped over a fluid conduit 502, a portion of the fluid conduit 502 is forcibly squeezed between the first central channel section 618a and the second central channel section 618b, so as to create the throat section 508 as shown in FIG. 3C.

According to some embodiments, the lateral width Wm of the central channel section 618 is larger than the diameter Di of the inlet channel section 614 and/or outlet channel section 616. Specifically, each of the first and second channels 604a and 604b, comprises a transition tapering portion (not numbered) sloping radially outward in a lateral direction (i.e., sideways). Advantageously, this configuration enables the throat section 508 of the fluid conduit 502 to extend laterally or sideways, when squeezed vertically within the central channel section 618. As stated above, the fluid conduit 502 can be a silicone tube or pipe. According to some embodiments, the silicone tube has a diameter ranging from about 0.01 cm to about 1 meter. According to some embodiments, the silicone tube has a diameter ranging from about 0.1 cm to about 1 cm, about 1 cm to about 10 cm, about 10 cm to about 50 cm, or about 50 cm to about 1 meter. According to some embodiments, the silicone tube has a diameter ranging from about 0.2 cm to about 0.8 cm.

According to some embodiments, the first 602a and second 602b clamping portions may be hinged to each other at one edge thereof, such as along a hinge line 606 (see FIG. 3A). while their opposite edges may be detachably attached to each other, enabling the first 602a and second 602b clamping portions to pivot relative to each other about the hinge line 606, and having their opposite edges extending away from each other in an open state as shown in FIG. 3A. The first 602a and second 602b clamping portions may be locked together, having their opposite edges pressed against each other, in the closed state, as shown in FIG. 3B.

Advantageously, forming the clamping device 600 from two portions that may be movable between open and closed states, as shown in FIGS. 3A-3B, enables simple and convenient placement of a fluid conduit within the clamping device 600, such that a single clamping device 600 can be utilized to measure flow of different fluid conduits 502, or even measure flow along different parts of the same fluid conduit 502 by clamping each time a different region of the fluid conduit 502.

According to some embodiments, the clamping device 600 comprises a locking mechanism configured to retain the first 602a and second 602b clamping portions tightly locked against each other in the closed state. According to some embodiments, at least one of the first 602a and/or second 602b clamping portions comprises at least one pin, configured to press-fit against a corresponding recess comprised in the opposite housing section. For example, FIG. 3A shows the first clamping portion 602a comprising two locking pins 608, configured to press-fit into respective locking recesses or bores 610, aligned there-against along the second clamping portion 602*b*. While two locking pins 608 and two matching locking bores 610 are illustrated in FIG. 3A, it will be clear that any number of pins and bores is contemplated, including, for example, a single pin 608 with a single bore 610, or three or more pins 608 with a matching number of bores 610.

While a locking mechanism including pins 608 and bores 610 is illustrated in FIG. 3A, it will be clear that other locking mechanisms are contemplated, such as latches, snap-fit members, screws, and the like.

While an exemplary embodiment is illustrated in FIG. 3A, showing two clamping portions 602 hinged along one edge thereof, in alternative embodiments, the clamping portions 602 are not hinged together, but are rather separable completely from each other, and may be secured to each other by a series of pins 608 and matching bored 610, for example, or screw holes for accepting locking screws, disposed along one or more edges thereof.

According to some embodiments, the clamping device 600 is formed from a rigid material, such as, but not limited to, rigid polymeric materials, metals, and the like. According to some embodiments, at least one section of the channel 604 comprises a recess extending radially outward. According to some embodiments, at least two sections of the channel 604 comprise, each, a recess extending radially outward. According to some embodiments, the inlet channel section 614 comprises an inlet recess 624, and the central channel section 618 comprises a central recess 628, as shown in FIG. 3A.

Each recess, such as inlet recess 624 and central recess 628, is configured to allow a portion of the fluid conduit 502 disposed there-against, to extend thereinto when the fluid conduit 502 expands due to the fluid pressure within the respective region thereof.

FIGS. 3A and 3C show an exemplary embodiment of a clamping device 600 comprising an inlet recess 624 extending radially outward from the first inlet channel section 614*a*, and a central recess 628 extending radially outward from the first central channel section 618*a*. The fluid conduit 502 is provided with a first sensing element 534*a* attached to the external surface of the inflow section 504, and a second sensing element 534*b* attached to the external surface of the throat 508, similar to the arrangement of FIG. 2C, such that when the clamping device 600 is clamped over the fluid conduit 502, the inlet recess 624 is aligned with the first sensing element 534*a*, and the central recess 628 is aligned with the second sensing element 534*b*.

Figure 3D:
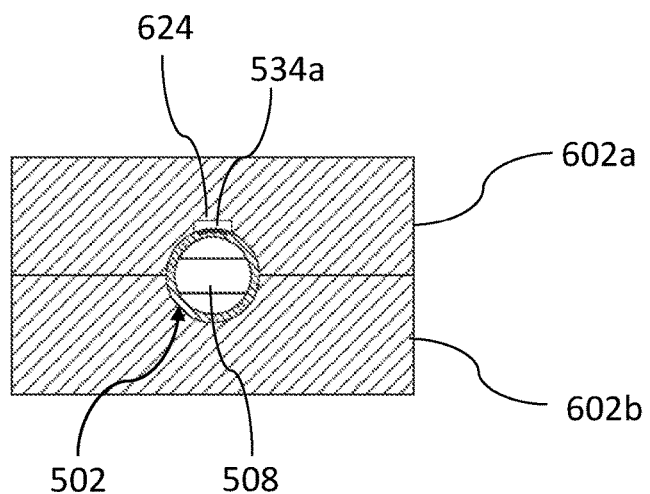
FIG. 3D shows a lateral cross-sectional view, taken along the line 3D-3D of FIG. 3C, according to some embodiments.

FIG. 3D shows a lateral cross-sectional view, taken along the line 3D-3D of FIG. 3C. As shown, the portion of the inflow section 504, to which the first sensing element 534*a* is attached, is aligned with and is free to extend into the inlet recess 624. Absent such a recess, the inlet section 504 might have been confined within the relatively rigid boundaries of the inlet channel section 614, unable to expand when the fluid pressure rises therein, thereby limiting the ability of the sensing elements to generate signals commensurate with the circumferential extensibility of the fluid conduit 504. Thus, a recess aligned with a corresponding sensing element 534, allows the portion of the fluid conduit 502 to which the sensing element 534 is attached, to expand thereinto, thereby enabling the corresponding sensing element 534 to measure the circumferential extension which is proportional to the internal pressure exerted thereon.

While FIGS. 3A, 3C and 3D show an exemplary embodiment of the recesses formed as relatively elongated recesses formed within the first clamping portion 602, it will be clear that any of the recesses can be formed within any of the clamping portions 602, and may follow various shapes, including arcuate or circumferential shapes, that may circumscribe, for example, a larger portion of the circumference or the entire circumference of the corresponding portion of the channel 604, and may extend thereby through both clamping portion 602 as well.

While FIGS. 3A, 3C and 3D show an exemplary embodiment of recesses extending from the inlet channel section 614 and the central channel section 618, it will be clear that a similar recess can extend radially away from the outlet channel section 616 (configuration not shown). For example, a clamping device can include a recess extending from the inlet channel section 614, such as inlet recess 624, and an outlet recess (not shown) extending in a similar manner from the outlet channel section 616, aligned with a first 534*a* and second 534*b* sensing elements that are attached to the outer surfaces of the inflow section 504 and the outflow section 506, similar to the arrangement shown in FIG. 2C.

Figure 3E:
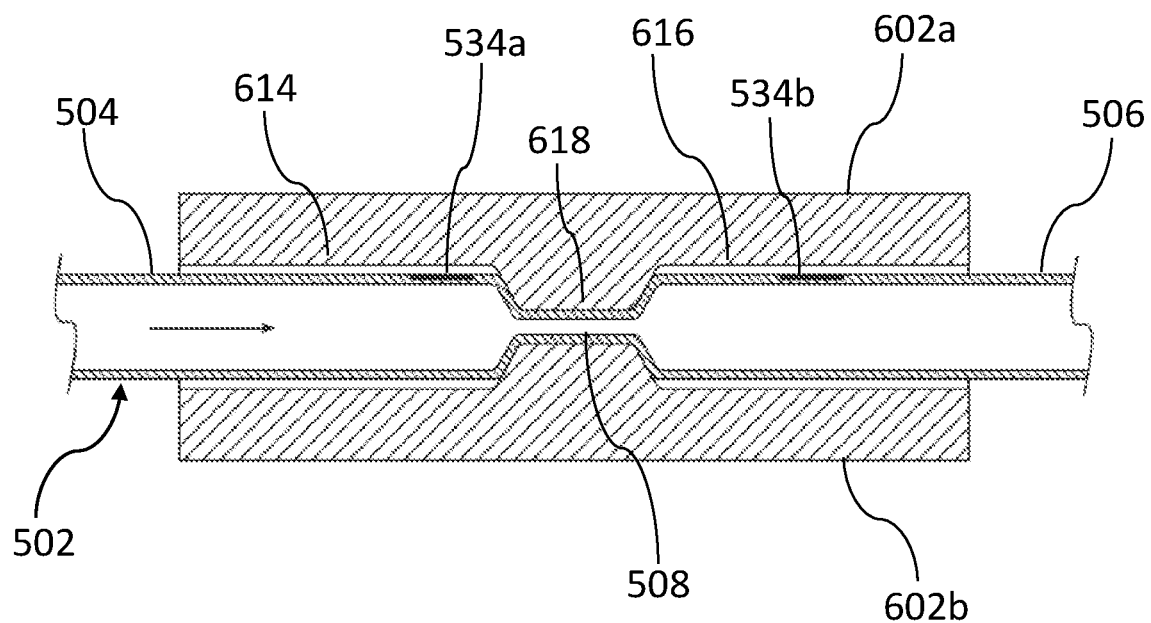
FIG. 3E shows a longitudinal cross-sectional view of the clamping device 600, according to some embodiments.

According to some embodiments, the diameter of the inlet channel section 614 and the outlet channel section 616 is larger than the diameter of the inflow section 504 and the outflow section 506, respectively. FIG. 3E shows a longitudinal cross-sectional view of a clamping device, which is similar to that shown and described in conjunction with FIG. 3C, except that the diameter of the inlet channel section 614 and the outlet channel section 616 is larger than the diameter of the inflow section 504 and the outflow section 506, respectively. The clamping device 600 shown in FIG. 3E is clamped over a fluid conduit 502 equipped with a first 534*a* and second 534*b* sensing elements that are attached to the outer surfaces of the inflow section 504 and the outflow section 506, similar to the arrangement shown in FIG. 2C. In the illustrated embodiment, the larger diameter of the inlet channel section 614 and the outlet channel section 616 allow the inflow section 504 and the outflow section 506 to expand therein, without the need for recesses.

According to some embodiments, the diameter of the inlet channel section 614 is larger than the diameter of the inflow section 504, similar to the embodiment illustrated in FIG. 3E, yet the central channel section 618 is equipped with a central recess 628, of the type illustrated, inert alia, in FIG. 3C. Such a clamping device 600 embodiment can be used with a fluid conduit 502 equipped with a first 534*a* and second 534*b* sensing elements that are attached to the outer surfaces of the inflow section 504 and the throat 508, similar to the arrangement shown in FIG. 2D. Specifically, the larger diameter of the inlet channel section 614 allow the inflow section 504 and the outflow section 506 to expand therein, without the need for an inflow recess, while the central recess 628 allows the portion of the throat section 508 carrying the second sensing element 534*b* to extend thereinto.

Advantageously, the present invention provides a clamping device 600 configured to exert pressure on a portion of a flexible fluid conduit, thus enabling an accurate and rapid determination of the fluid flow rate/velocity within the flexible fluid conduit by applying the method 200 of the present invention as presented herein and by utilizing the Venturi effect.

According to some embodiments, the first sensing element, the second sensing element, and method 200 as presented herein can be utilized to measure or monitor the lateral strains and/or the normal forces associated with pressure changes of the fluid flowing within the flexible fluid conduit or temperature changes thereof as a result of flow changes therewithin by applying clamping device 600 to a portion of the flexible fluid conduit.

Figure 3F:
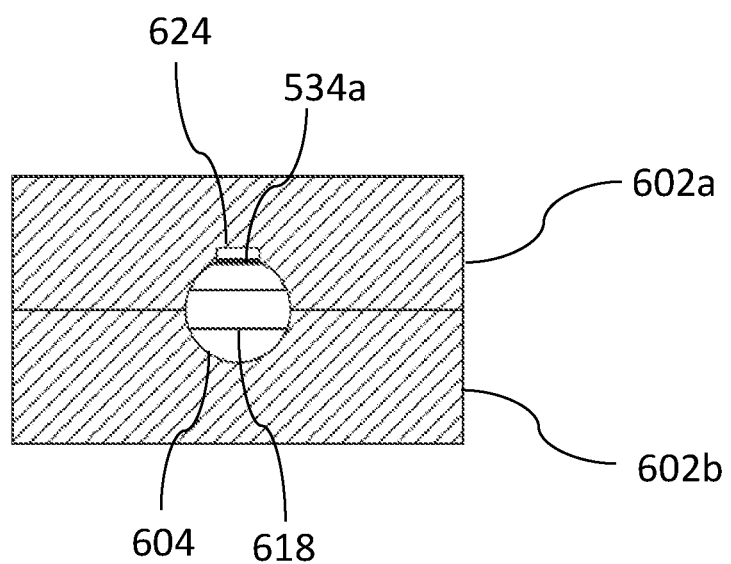
FIG. 3F shows a lateral cross-sectional view of a clamping device 600 along the same region as that shown in FIG. 3D, but without the fluid conduit 502, according to some embodiments.

According to some embodiments, the at least one sensing element 534 is attached to the enclosed channel 604 of the clamping device 600 instead of the fluid conduit 502, wherein the at least one element 534 is aligned with and stretched over a recess of the channel 604 between both opposing edges of the recess. FIG. 3F shows a lateral cross-sectional view of a clamping device 600 along the same region as that shown in FIG. 3D, but without the fluid conduit 502. As shown in the embodiments illustrated in FIG. 3F, a first sensing element 534a is attached to the inner surface of the inlet channel section 614 on both sides of the inlet recess 624, such that the first sensing element 534a is stretched over the inlet recess 624 between both opposing edges of the inlet recess 624. When a fluid conduit is places within the clamping device 600 in the closed state of the clamping device 600, the inflow section 504 at the region aligned with the inlet recess 624 may extend into the inlet recess 624, thereby further stretching the first sensing element 534a therewith. It will be clear that a second sensing element 534b can be stretched over and attached to both edges of a central recess 628 or an outlet recess (not shown) in a similar manner, to function in a similar way.

The term "plurality", as used herein, means more than one.

The term "about", as used herein, when referring to a measurable value such as an amount, a temporal duration, and the like, is meant to encompass variations of +/−10%, more preferably +/−5%, even more preferably +/−1%, and still more preferably +/−0.1% from the specified value, as such variations are appropriate to the disclosed devices, systems and/or methods.

Unless otherwise defined, all technical and scientific terms used herein have the same meaning as commonly understood by one of ordinary skill in the art to which this invention pertains. In case of conflict, the patent specification, including definitions, governs. As used herein, the indefinite articles "a" and "an" mean "at least one" or "one or more" unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. No feature described in the context of an embodiment is to be considered an essential feature of that embodiment, unless explicitly specified as such.

EXAMPLES

Example 1—Sensing Element Fabrication Process and Sensitivity Characterization

The sensing elements used in the Examples 1-5 hereinbelow were fabricated using two different protocols, including a non-direct fabrication process and a direct fabrication process.

The non-direct fabrication process included the following steps:
1. Nanoparticle ink was printed over a thin sheet (thickness of about 12 μm) of a flexible substrate comprising Kapton, having conductive electrodes comprising copper or gold, thereby forming a piezo-resistive pressure sensing part sensitive not only to normal forces but also to lateral forces. The nanoparticle ink consisted of 5-50 layers of gold nanoparticles capped with organic ligands.
2. A thin layer (thickness of about 50 μm) of polydimethylsiloxane (PDMS) was applied on the sensing part as a protective layer.

The direct fabrication process included the following steps:
1. Conductive electrodes comprising silver (e.g. AgCite from Nanodimension) were printed and patterned directly on an external surface of a pipe. Photonic sintering (e.g. by Xenon) was performed in order to sinter the silver electrodes and make them conductive, e.g. having a resistance of less than 50 ohm.
2. Nanoparticle ink was printed directly between the conductive electrodes using inkjet, thereby forming a piezo-resistive pressure sensing part sensitive not only to normal forces but also to lateral forces. Photonic sintering (e.g. by Xenon) was performed to reach sensor baseline resistance of Kilo ohms. The nanoparticle ink consisted of 5-50 layers of gold nanoparticles capped with organic ligands.
3. A thin layer (thickness of about 50 μm) of polydimethylsiloxane (PDMS) was applied on the sensing part as a protective layer.

In order to assess sensitivity of the obtained sensing elements, the response of the sensing element prepared by the non-direct fabrication process and of the sensing element prepared by the direct fabrication process to pressure were evaluated and compared to pressure changes measured with a reference pressure sensor.

Figure 4A:
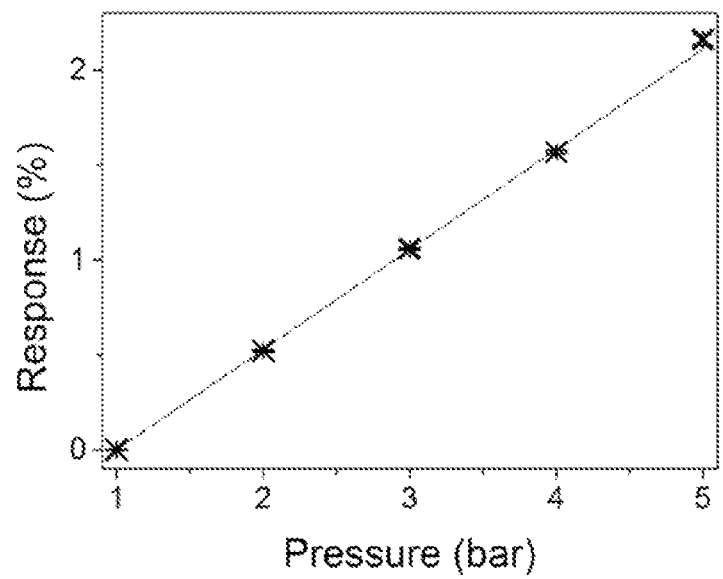
FIGS. 4A-4B represent the response a first sensing element prepared by a non-direct fabrication process to variations in pressure of a fluid (e.g., $N_2$) flowing inside a tube: adhered to the external surface of a rubber tube (FIG. 4A), or adhered to the external surface of a silicon tube (FIG. 4B). The error bars in FIG. 4A stand for the standard deviation of 100 resistance measurements at specific pressure (R square>0.999), while the error bars in FIG. 4B stand for the standard deviation of 100 resistance measurements at specific pressure (R square>0.998).
Figure 4B:
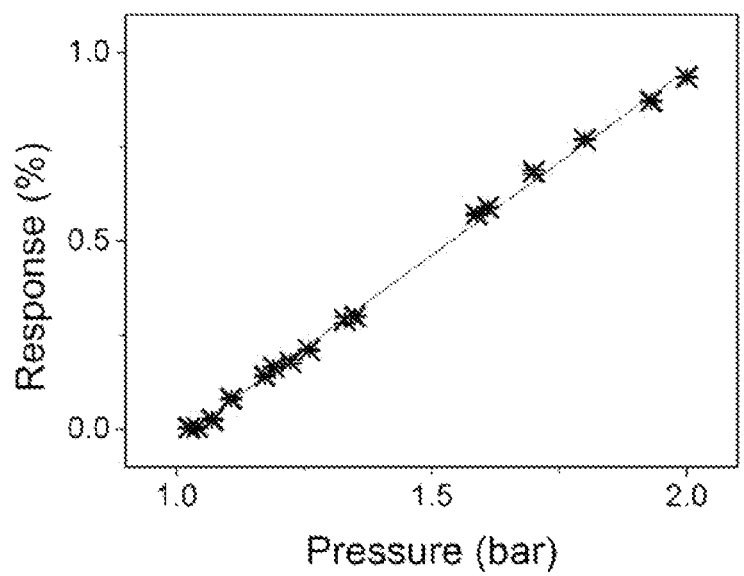

The response of the sensing element prepared by the non-direct fabrication process to variations in pressure of $N_2$ gas flowing inside a tube was tested, wherein the first sensing element was adhered to the external surface of a rubber tube (FIG. 4A) or to the external surface of a silicon tube (FIG. 4B). The rubber tube had a total diameter of 10 mm and wall thickness of 1 mm, while the silicon tube had a total diameter of 6 mm and wall thickness of 1 mm. The pressure inside the tubes was measured with an external pressure sensor (Lutron Electronic Enterprise). As can be seen in FIGS. 4A-4B, the response shows a wide range of sensitivity (1-5 bars) and high resolution to small pressure changes (tens of millibars) for both tubes. The baseline resistances of the sensors were 2 Mohm±0.5 Mohm.

Figure 5:
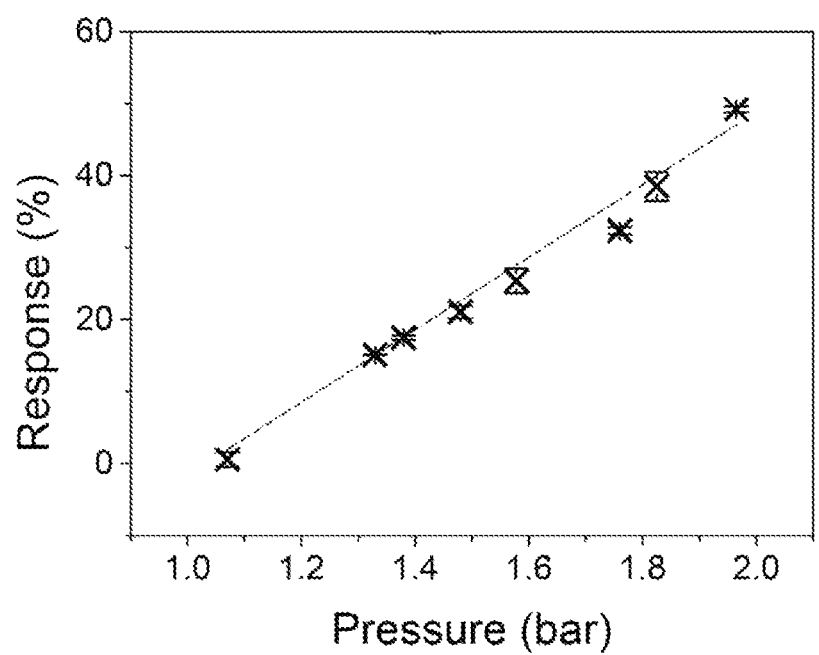
FIG. 5 represent the response of a second sensing element prepared by a direct fabrication process to variations in pressure of a fluid (e.g., $N_2$) flowing inside a silicon tube. The error bars stand for the standard deviation of 10 resistance measurements at specific pressure (R square>0.98).

The response of the sensing element prepared by the direct fabrication process to variations in pressure of $N_2$ gas flowing inside a tube was tested, wherein the second sensing element was printed on the external surface of a silicon tube (FIG. 5). The silicon tube had a total diameter of 6 mm and wall thickness of 1 mm. The pressure inside the tube was measured with the external pressure sensor.

Changes in fluid pressure within the tube can cause lateral surface strains, and the strain can be measured by the sensing elements. As can be seen in FIGS. 4A-4B and FIG. 5, the sensing element provides high sensitivity to strain and therefore enables measuring pressure changes with a high resolution (ten of millibars). The indication of pressure changes with high pressure sensing resolution can be used in order to detect minute differences between the flow of the fluid along the pipeline, from which various important parameters characterizing pipeline integrity and stability, can be deduced.

Example 2—Activation Time Transfer Determination

A pneumatic actuator comprising a valve was operationally connected to a fluid pipe made of stainless steel having a diameter of 1/8"(inch). A pneumatic actuation pipe line is connected to the pneumatic actuator at an actuation inlet.

Two sensing elements were fabricated by the non-direct fabrication process, as described in Example 1.

The sensing elements were placed according to the setup illustrated at FIG. 2A: one sensing element was adhered to an external surface of an actuation inlet of the pneumatic actuator (pneumatic/hydraulic line 322 of FIG. 2A), while the other sensing element was adhered to an external surface of the pipe in the downstream exhaustion outlet section (outflow section 306 of FIG. 2A) in proximity to the valve, using PANGOFOL (two part rubber bonding cement with activator 968F). A controller (PLC) having an electrical circuit was operationally connected to the sensing elements and was used to measure the resistance and resistance changes of the nanoparticles.

Two types of pneumatic actuators were used, one having a long pneumatic actuation line and a second having a short pneumatic actuation line (as illustrated by pneumatic/hydraulic outflow 320 of FIG. 2A).

The length of the long pneumatic actuation line was 13.5 meters, while the length of the short pneumatic actuation line was 3.5 meters. Both lines consisted of a pipe having a diameter of 6 mm. The difference between the long pneumatic pressure actuation line compared to the short pneumatic pressure actuation line was about 10 meters.

The steady state downstream flow duration and activation transfer time were determined based on the readings from both sensing elements during fluid flow in the pipe and in response to the opening and closing of the valve. The PLC was configured to open the valve for a time duration of 1 sec.

Figure 6A:
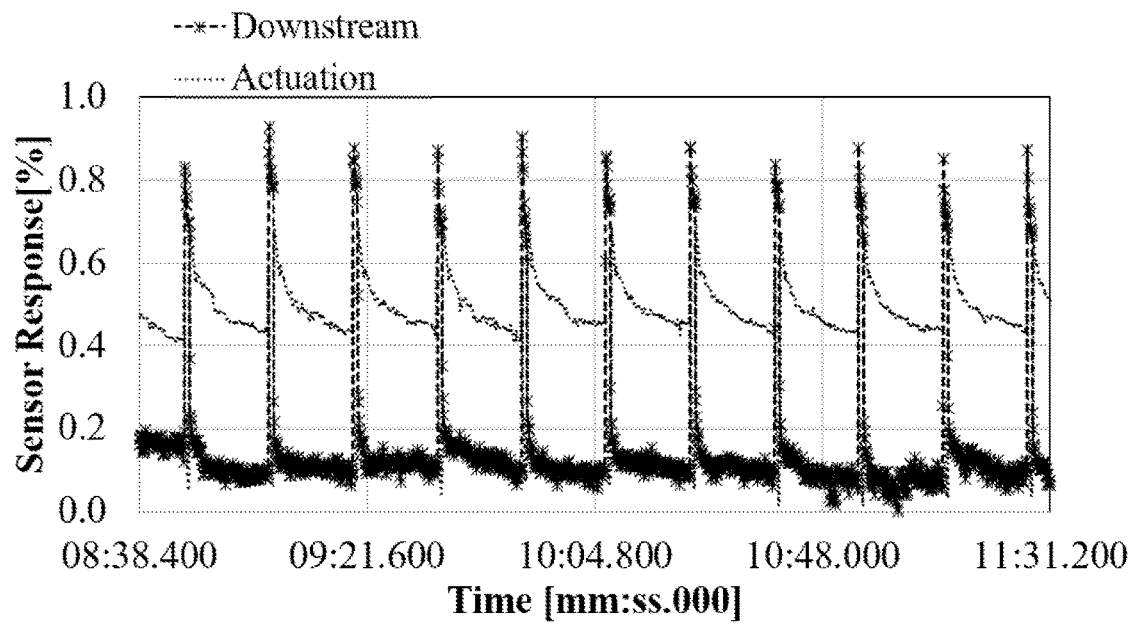
FIGS. 6A-6D represent the sensing elements response to multiple openings and closings of a pneumatic valve: setup with short actuation line (FIG. 6A); partial zoomed-in view of one opening and closing event from FIG. 6A (FIG. 6B); setup with long actuation line (FIG. 6C); and partial zoomed-in view of one opening and closing event from FIG. 6C (FIG. 6D). Dots indicate the readings from the sensing element located at the actuation inlet (also termed herein "Actuation"), while exes indicate readings from the sensing element located at the valve's outlet, i.e., a downstream pipe (also termed herein "Downstream").
Figure 6B:
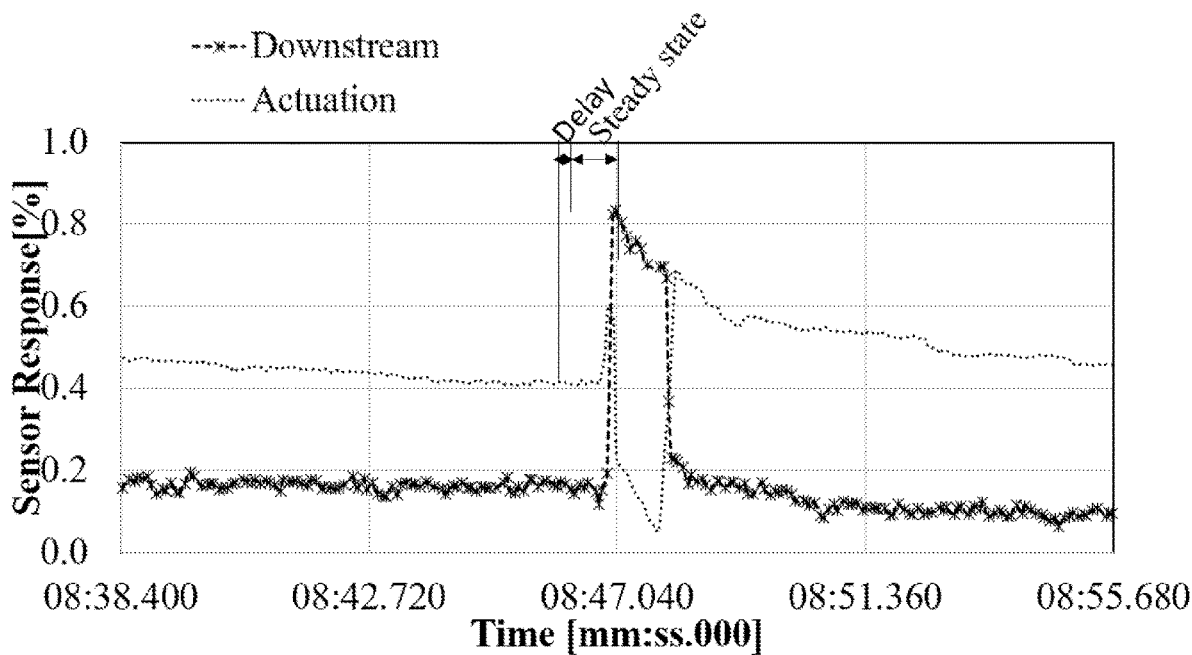
Figure 6C:
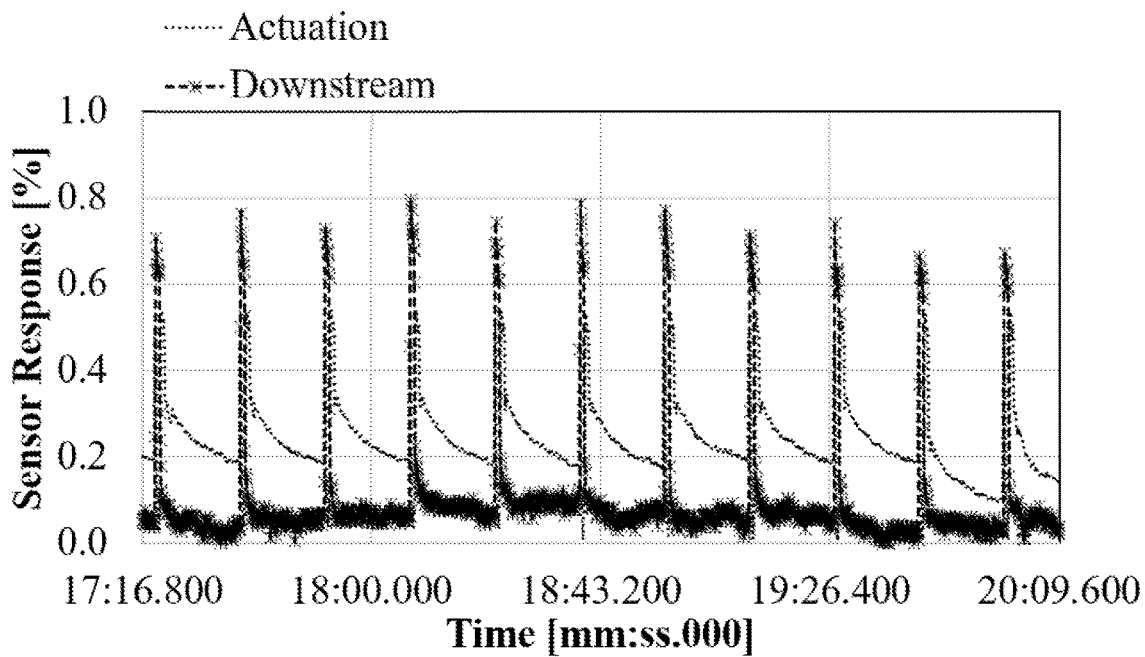
Figure 6D:
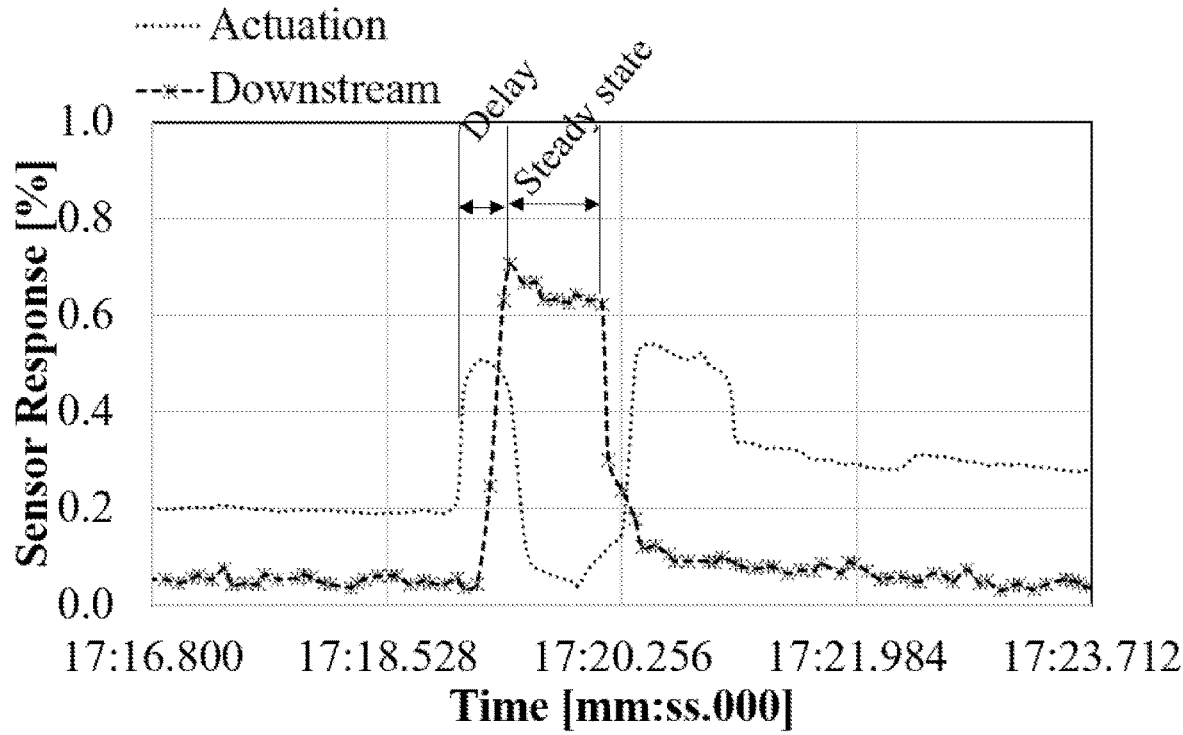

The activation transfer time (also termed in this Example "delay") and the steady state downstream flow (also termed in this Example "steady state") were tested as a function of the activation pneumatic line length, as can be seen in FIGS. 6B and 6D.

As can be seen in FIGS. 6A-6D and in Table 1, the activation transfer time (marked as "delay" at FIGS. 6B and 6D) was found to be higher (230 milliseconds) in the case of the valve operated with a long pneumatic actuation line than compared to the short pneumatic actuation line (120 milliseconds). The steady state (marked as "steady state" at FIGS. 6B and 6D) was also found to vary between the valve operated with the long pneumatic actuation line (700 milliseconds) than compared to the short pneumatic actuation line (880 milliseconds).

TABLE 1 the time delay and steady state exhaust duration in short and long actuation lines.

|  | Activation transfer time (sec) | Steady state duration (sec) |
| --- | --- | --- |
| Short activation line | 0.12 ± 0.04 | 0.88 ± 0.044 |
| Long activation line | 0.23 ± 0.034 | 0.7 ± 0.035 |

As can be deduced from Table 1, the sum of the steady state duration and activation transfer time is close to 1 sec, which is the time that the PLC was configured to open the valve, yet, the actual time that the valve was open is significantly shorter and can vary as a function of the pneumatic activation line length. This information can be critical for many processes, specifically where the accuracy of the steady state and activation transfer time can affect manufacturing processes and the product quality and characteristics.

Example 3—Clamping Device Design and Testing for Use in Fluid Flow Rate Determination A static pressure experiment was performed in order to evaluate the feasibility of measuring fluid flow rate by using a clamping device, and in particular, to assess the effect of grooves within the clamping device on strain-induced sensing elements' response. Two sensing elements were fabricated, utilizing the direct fabrication process as described in Example 1.

The sensing elements were marked G1 and G2 (FIGS. 7A-7D). Two tests were conducted. In the first test, the two sensing elements were adhered to the outer surface of 1/8" (inch) outer diameter of a flexible silicon tube using a silicon adhesive, without using a clamp, and their response to static pressure was measured.

Figure 7A:
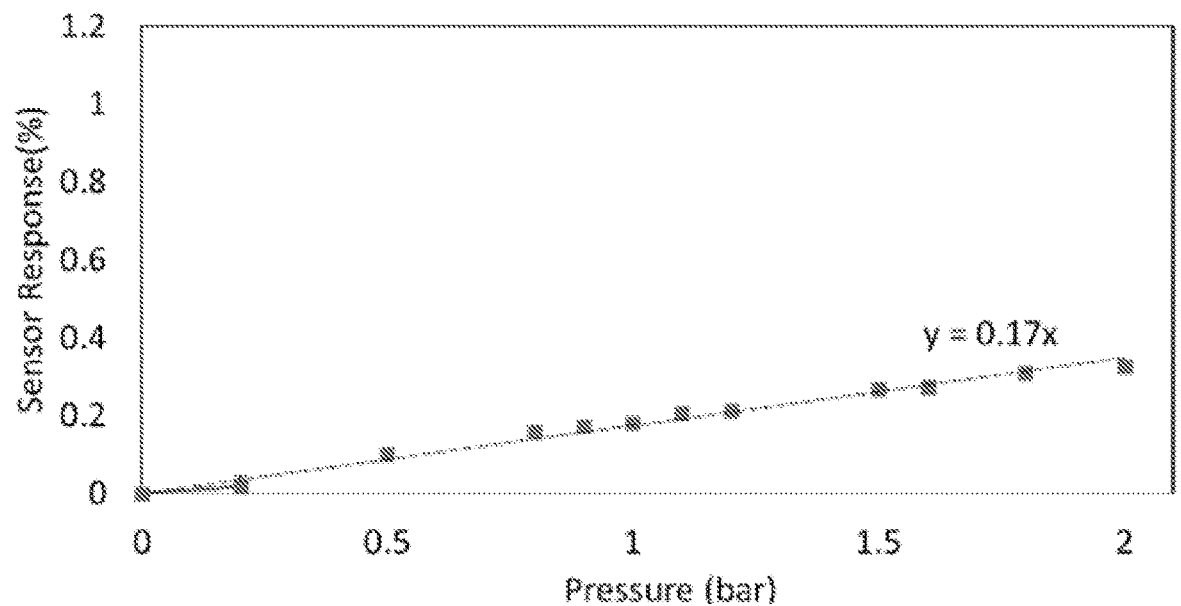
FIGS. 7A-7D represent the sensing elements response to static pressure: the response of sensing element G1 in the first test (FIG. 7A); the response of sensing element G1 in the second test (FIG. 7B); the response of sensing element G2 in the first test (FIG. 7C); and the response of sensing element G2 in the second test (FIG. 7D).
Figure 7B:
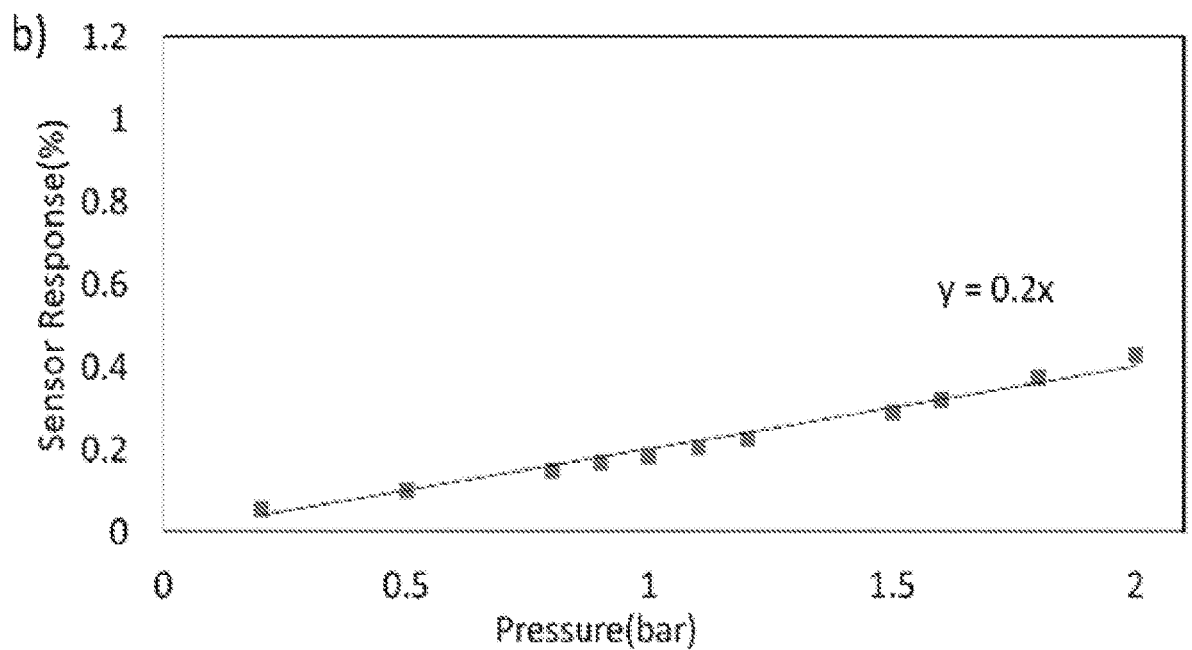
Figure 7C:
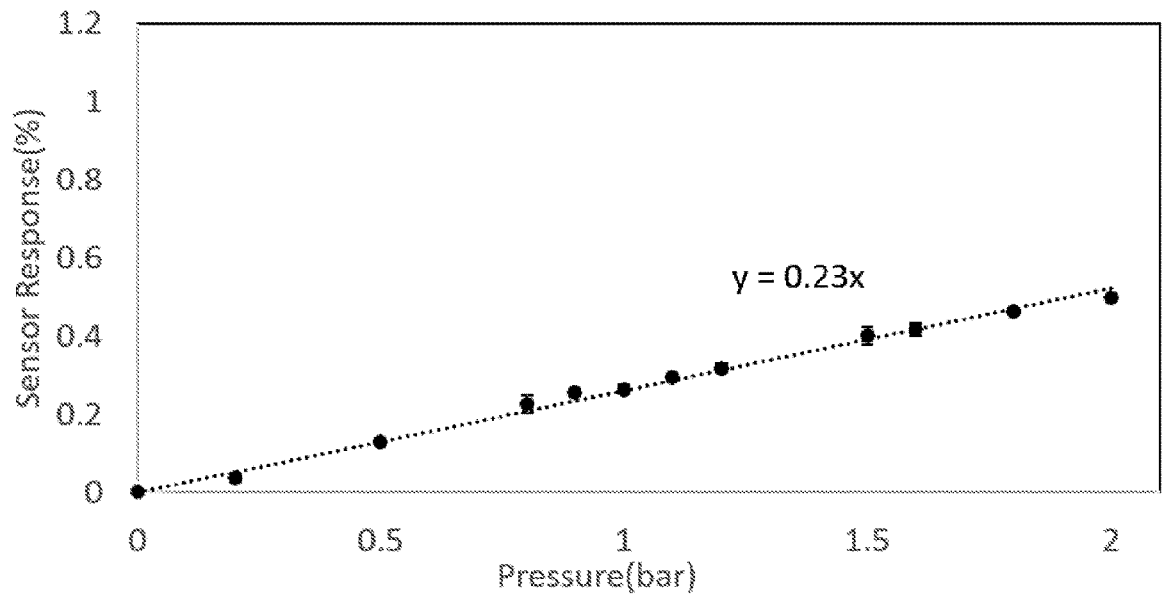

As can be seen at FIG. 7A for G1 and FIG. 7C for G2, the two sensing elements exhibited similar response with average sensitivity value of 0.2%/bar. Without wishing to being bound by theory or mechanism of action, it is contemplated that it is possible that the differences in the sensitivity values may result from inherent changes between the sensing elements and the adhesion process prior to testing.

In the second test, the two sensing elements were adhered to the outer surface of 1/8" (inch) outer diameter of the flexible silicon tube using a silicon adhesive, wherein a clamp was used to provide external pressure on a section of the tube where sensing element G2 was attached, resulting in the decrease of the diameter of said section (throat section), and thereby creating a Venturi effect within the tube.

The clamp was manufactured according to the design of FIG. 3C as presented herein above, wherein the first sensing element was attached to the inlet recess 624 and the second sensing element was attached to the central recess 628. The clamp was made of ABS plastic.

The sensing elements response to static pressure was measured.

Figure 7D:
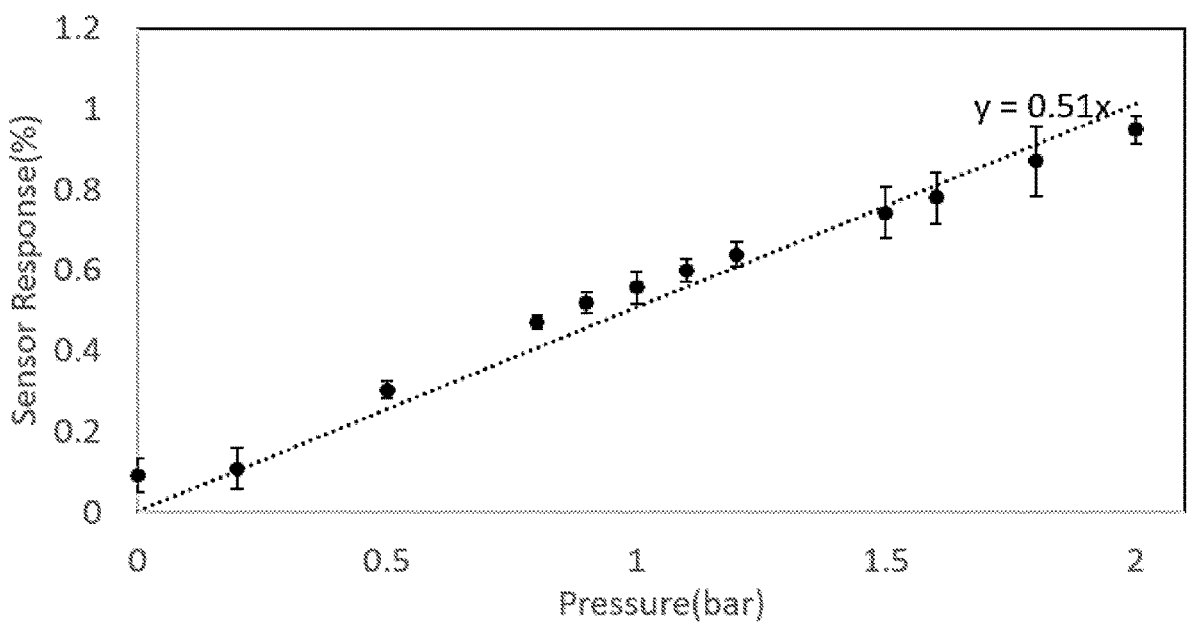

As can be seen at FIG. 7B for G1 and FIG. 7D for G2, the response of G1 increased slightly when compared to the free-standing tube (from sensitivity value of 0.17 to 0.2%/bar). G2 was clamped so the flexible tube diameter was changed dramatically. As a result, G2 showed enhanced responses to pressure (sensitivity values increased from 0.23 to 0.51%/bar), indicating increased strain, indicating increased strain on the tube with the diminished cross-sectional diameter, wherein G2 contacts the groove on the clamping device, which allows tube expansion.

It can be concluded based on FIGS. 7A-7D that the clamping device generate increased strains for the flexible silicon tube, and therefore the clamp can aid to have high resolution and enhanced sensitivity of the sensing element's response.

Example 4—Fluid Flow Rate Determination

The correlation between various flow rates of a fluid within a pipe and a difference between responses of two sensing elements was tested. Water were pumped from a water tank using a pump. The experiments were performed at two different pressures: 1.1 bar and 0.4 bar, in order to test the dependency on the system pressure. A pressure gauge was placed after the pump to regulate the line pressure. Two sensing elements were fabricated, utilizing the non-direct fabrication process as described in Example 1.

The two sensing elements were adhered to the outer surface of ⅛" (inch) outer diameter of the flexible silicon tube using a silicon adhesive, wherein a clamp was used to provide external pressure on the tube and form a throat section. The clamping device was manufactured according to the design of FIG. 3E as presented herein above. The two sensing elements were adhered directly to the clamping device, wherein the first sensing element was adhered at a position located prior to the throat section (inlet channel section 614), and the second sensing element was adhered at a position located following the throat section (outlet channel section 616). The ⅛" silicon tube was connected to a flow meter to regulate the flow during the experiments. The sensing elements were operationally connected to a data acquisition unit (DAU), configured to record the electrical resistance of the sensing elements and send the data via wireless connection (Bluetooth) to be digitally stored at a cloud (thought a gateway).

Figure 8A:
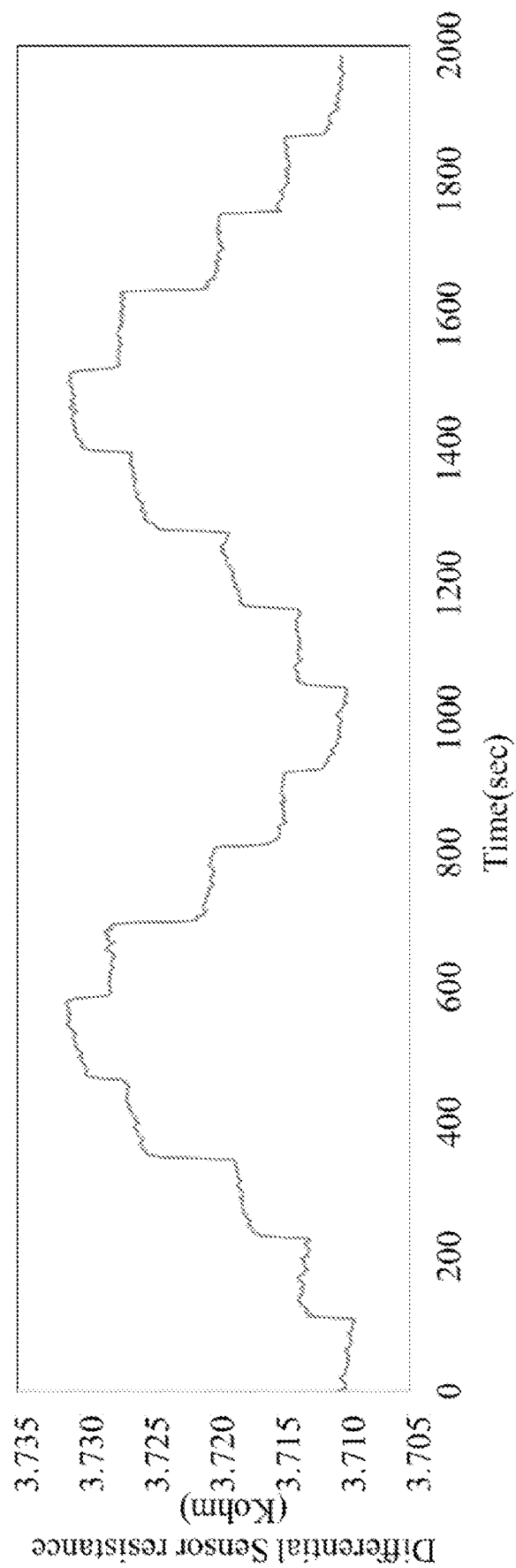
FIGS. 8A-8C represent a correlation between sensing elements' response and various flow rates: Differential resistance measurements between the two sensing elements, wherein the flow rate was changed with 100 ml/min steps: 0, 100, 200, 300, 360 ml/min, and then decreased in a similar manner. The pressure in the line was 0.4 bar (FIG. 8A); Differential response as a function of the flow rate with inline pressure of 0.4 bar (FIG. 8B); and Differential response as a function of the flow with inline pressure of 1.1 bar (FIG. 8C). The error bars stand for the standard deviation of 4-6 measurements.
Figure 8B:
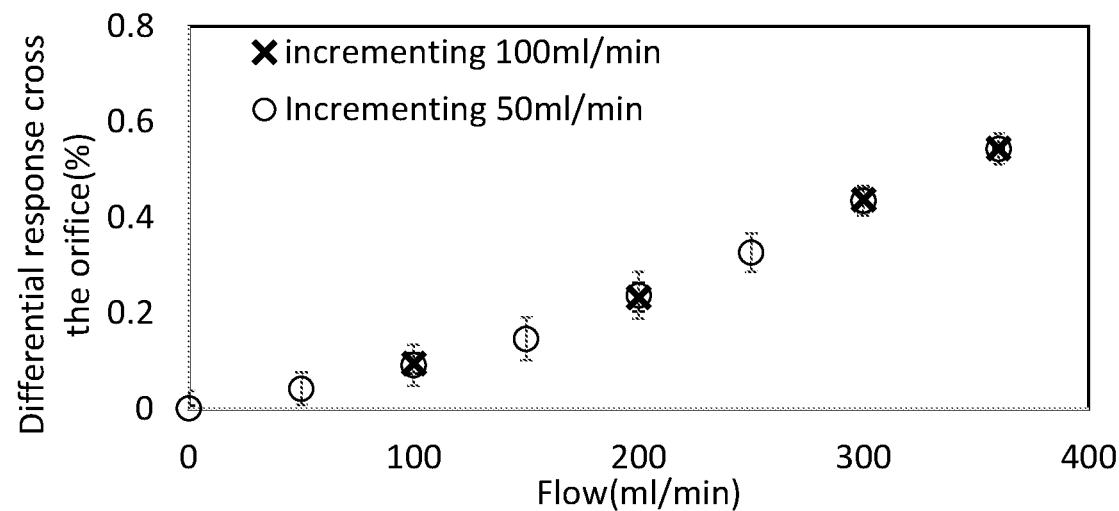
Figure 8C:
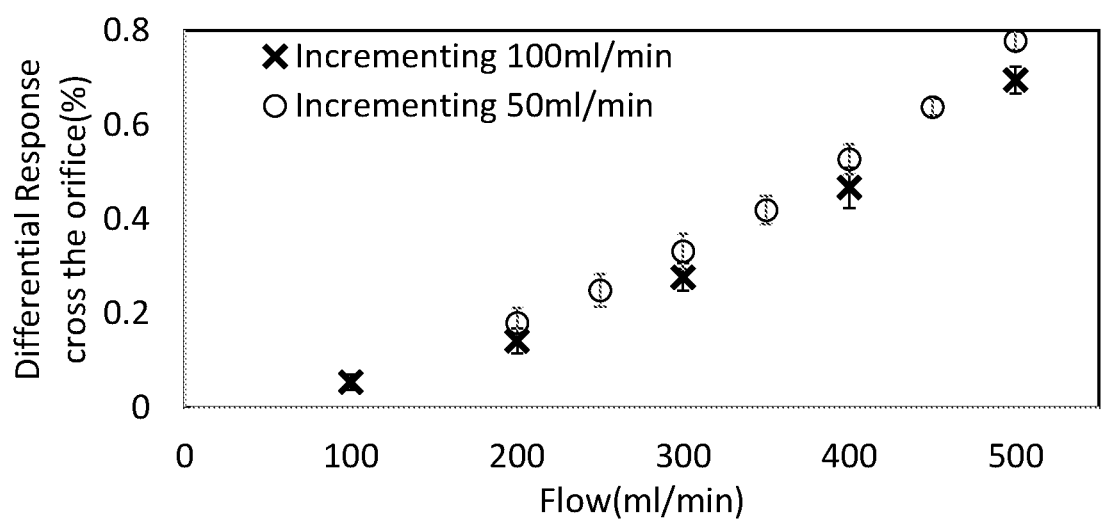

The results of the correlation between the flow rate and the measured differential electrical resistance of the sensing elements are summarized in FIGS. 8A-8C. As can be seen in FIG. 8A, increasing the flow rate resulted in increasing the difference in resistance between the two sensing elements and therefore in the differential signal which was recorded. The differential value is similar per same flow so the response repeatability was high. For example, a flow of 100 ml/min was set in 180, 850, 1100 and 1800 sec, and the differential reading was similar with value of 3.715 Kohm.

In FIGS. 8B-8C the correlation between the differential response to the flow is presented for two different inline pressures, 0.4 bar (FIG. 8B) and 1.1 bar (FIG. 8C).

The graphs shown in FIGS. 8B-8C can be used as calibrations curves for evaluating the flow rate of a fluid within said tube depending on the measured differential sensing elements electrical resistance.

Example 5—Gamma Radiation Testing

The effect of gamma radiation was tested by exposing 5-6 sensing elements to doses of irradiation. The sensing elements were fabricated utilizing the non-direct fabrication process as described in Example 1. The irradiation was conducted by Sor-Van Radiation Ltd. Each dose had a dosimeter reading of 29.4 KGy. Five sensing elements were exposed to one dose. Six different sensing elements were exposed to two doses. The baseline resistance and the Gauge Factor (GF) were measured before and after the radiation process. The results are summarized in Table 2.

Typical sensing elements/measurement setup variance in GF is up to 10%.

Figure 9:
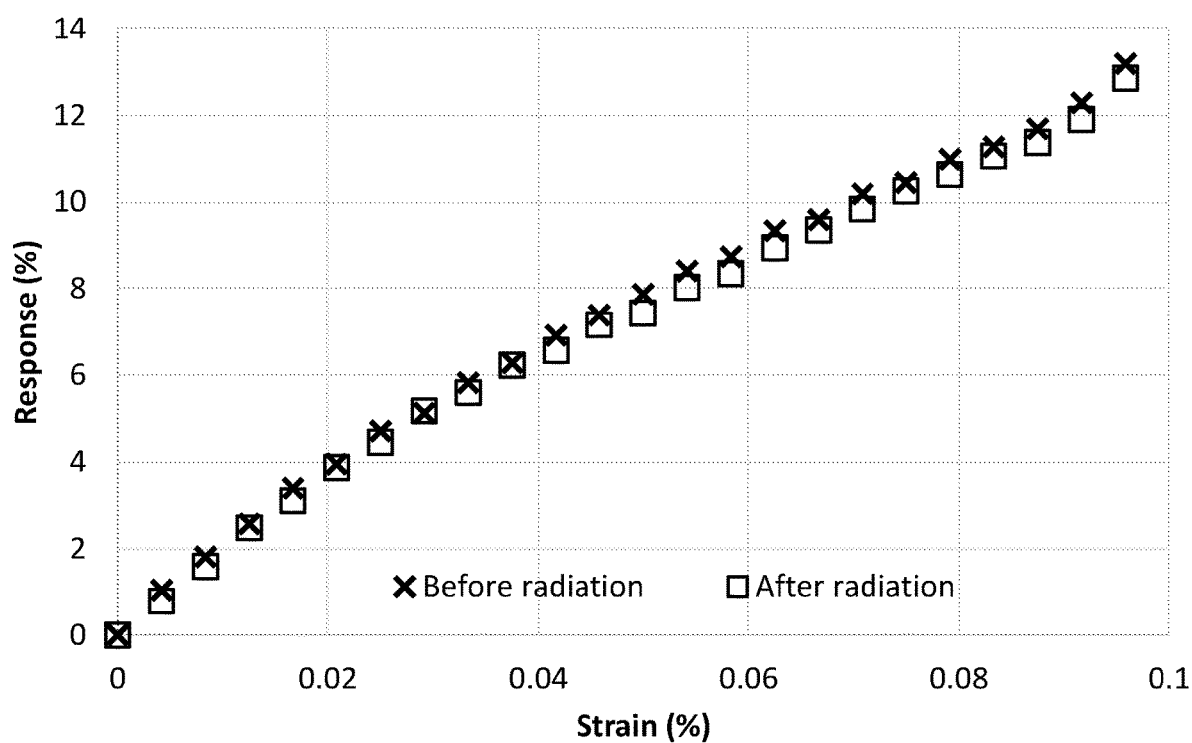
FIG. 9 represent the response of sensing elements to strain before and after gamma radiation. The response of the sensing elements to strain before gamma radiation is represented by exes, while the response of the sensing elements to strain after gamma radiation is represented by squares.

As can be seen in FIG. 9, no meaningful sensing elements changes were detected resulting from the gamma radiation (one or two doses).

TABLE 2 sensing element's response to radiation

|  | # Sensing elements | Average baseline resistance change (%) | Average GF change* (%) |
|---|---|---|---|
| one dose | 5 | 3.8 | 6.8 |
| two doses | 6 | 4.7 | 3.9 |

Although the invention is described in conjunction with specific embodiments thereof, it is evident that numerous alternatives, modifications and variations that are apparent to those skilled in the art may exist. It is to be understood that the invention is not necessarily limited in its application to the details of construction and the arrangement of the components and/or methods set forth herein. Other embodiments may be practiced, and an embodiment may be carried out in various ways. Accordingly, the invention embraces all such alternatives, modifications and variations that fall within the scope of the appended claims.

The invention claimed is:

1. A method for determining a parameter associated with a flow of a fluid located within a fluid conduit, the method comprising:
    providing at least a first and a second sensing elements comprising an assembly of nanoparticles being in electric contact with conductive electrodes; wherein the first sensing element contacts a first position on an exterior of the fluid conduit and the second sensing element contacts a second position on the exterior of the fluid conduit;
    measuring an electrical signal of the first and the second sensing elements; wherein the electrical signal is responsive to at least one of pressure and temperature; and
    determining, based on a difference between the electrical signals of the first and the second sensing elements, said parameter,
    wherein the first and the second sensing elements are:
        printed on the exterior of the fluid conduit;
        provided on a substrate, wherein the substrate is adhered to the exterior of the fluid conduit; or
        attached to an inner surface of a clamping device,
    wherein the first and the second sensing elements are connected to a mutual time monitoring system and wherein said difference between the electrical signals of the first and the second sensing elements is a time related difference between the occurrence of a change in the measured electrical signals of the first and the second sensing elements,
    wherein said parameter is indicative of a pressure wave velocity, wherein (A) the fluid conduit comprises a valve and a pipe fluidly connected with the valve, wherein the fluid flows from the valve to the pipe, wherein the first position is located on the pipe in a close proximity to the valve and the second position is located on the pipe at a distance of at least about 10 cm from the first position or (B) the fluid conduit comprises a first pipe and a second pipe fluidly connected through a valve, wherein the first position is located on the first pipe in close proximity to the valve and the second position is located on the second pipe at a distance of at least about 5 cm from the valve, and wherein the method further comprises:
        providing a third sensing element comprising an assembly of nanoparticles being in electric contact with conductive electrodes; wherein the third sensing element contacts a third position on an exterior of the fluid conduit;
        measuring an electrical signal of the third sensing element, wherein the electrical signal is responsive to at least one of pressure and temperature; and
        determining, based on a difference between the electrical signals of the first, the second, and the third sensing elements, said parameter.

2. The method according to claim 1, wherein the measurement of the electrical signals of the first and the second sensing elements is performed simultaneously.

3. The method according to claim 1, comprising learning, during a learning period, a relationship between values of the difference between the electrical signals of the first and the second sensing elements and values of said parameter, wherein the determining of said parameter is based on the relationship.

4. The method according to claim 1, wherein the fluid conduit comprises a valve, a first pipe, and a second pipe, wherein the first and the second pipes are fluidly connected through the valve, and wherein the first position is located on the first pipe in close proximity to the valve, the second position is located on the second pipe in close proximity to the valve, and the third position is located on the second pipe at a distance of at least about 10 cm from the second position.

5. The method according to claim 1, wherein the electrical signal is produced by swelling or aggregation of the assembly of nanoparticles in response to changes in at least one of pressure and temperature, and wherein the pressure comprises lateral pressure.

6. The method according to claim 5, wherein the electrical signal is proportional to the amount of deflection of the fluid conduit wall and wherein said electrical signal is selected from the group consisting of resistance, conductance, alternating current (AC), electrical potential and combinations thereof.

7. The method according to claim 1, wherein the nanoparticles comprise gold (Au) nanoparticles capped with an organic coating selected from the group consisting of: alkylthiols, arylthiols, alkylarylthiols, alkenyl thiols, alkynyl thiols, cycloalkyl thiols, heterocyclyl thiols, heteroaryl thiols, alkylthiolates, alkenyl thiolates, alkynyl thiolates, cycloalkyl thiolates, heterocyclyl thiolates, heteroaryl thiolates, ω-functionalized alkanethiolates, arenethiolates, (ω-mercaptopropyl)tri-methyloxysilane, dialkyl disulfides and combinations thereof.

8. The method according to claim 1, wherein the first and the second sensing elements are printed on the exterior of the fluid conduit.

9. The method according to claim 1, wherein the first and the second sensing elements are provided on the substrate, wherein the substrate is adhered to the exterior of the fluid conduit.

10. The method according to claim 1, wherein the first and the second sensing elements are attached to an inner surface of the clamping device.

* * * * *